United States Patent
Kadu et al.

(10) Patent No.: US 12,086,969 B2
(45) Date of Patent: Sep. 10, 2024

(54) MACHINE LEARNING BASED DYNAMIC COMPOSING IN ENHANCED STANDARD DYNAMIC RANGE VIDEO (SDR+)

(71) Applicant: DOLBY LABORATORIES LICENSING CORPORATION, San Francisco, CA (US)

(72) Inventors: Harshad Kadu, Santa Clara, CA (US); Neeraj J. Gadgil, San Jose, CA (US); Guan-Ming Su, Fremont, CA (US)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 608 days.

(21) Appl. No.: 17/415,650

(22) PCT Filed: Dec. 16, 2019

(86) PCT No.: PCT/US2019/066595
§ 371 (c)(1),
(2) Date: Jun. 17, 2021

(87) PCT Pub. No.: WO2020/131731
PCT Pub. Date: Jun. 25, 2020

(65) Prior Publication Data
US 2022/0058783 A1    Feb. 24, 2022

Related U.S. Application Data
(60) Provisional application No. 62/781,185, filed on Dec. 18, 2018.

(30) Foreign Application Priority Data
Dec. 18, 2018  (EP) ..................... 18213670

(51) Int. Cl.
G06T 5/92   (2024.01)
G06N 20/00  (2019.01)
G06T 7/90   (2017.01)

(52) U.S. Cl.
CPC ............... *G06T 5/92* (2024.01); *G06N 20/00* (2019.01); *G06T 7/90* (2017.01); *G06T 2207/20081* (2013.01); *G06T 2207/20208* (2013.01)

(58) Field of Classification Search
CPC ... G06T 5/92; G06T 7/90; G06T 2207/20081; G06T 2207/20208; G06N 20/00; G06V 10/40; G06V 10/82
See application file for complete search history.

(56) References Cited

U.S. PATENT DOCUMENTS 9,098,906 B2 * 8/2015 Bruls .................. H04N 19/184
2018/0020224 A1  1/2018 Su
(Continued)

FOREIGN PATENT DOCUMENTS

CN    103747189 A    4/2014
CN    108681991 A    10/2018
(Continued)

OTHER PUBLICATIONS

Carl Edward Rasmussen and Christopher K. I. Williams, "Gaussian Process for Machine Learning," The MIT Press, 2006. ISBN 0-262-18253-X.
(Continued)

*Primary Examiner* — Daniel G Mariam

(57) ABSTRACT

Training image pairs comprising training SDR image and corresponding training HDR images are received. Each training image pair in the training image pairs comprises a training SDR image and a corresponding training HDR image. The training SDR image and the corresponding
(Continued)

training HDR image in the training image pair depict same visual content but with different luminance dynamic ranges. Training image feature vectors are extracted from training SDR images in the training image pairs. The training image feature vectors are used to train backward reshaping metadata prediction models for predicting operational parameter values of backward reshaping mappings used to backward reshape SDR images into mapped HDR images.

15 Claims, 10 Drawing Sheets

(56) References Cited

U.S. PATENT DOCUMENTS

| | | | |
|---|---|---|---|
| 2018/0098094 A1 | 4/2018 | Wen | |
| 2018/0115777 A1 | 4/2018 | Piramanayagam | |
| 2018/0350047 A1 | 12/2018 | Baar | |
| 2019/0349607 A1 | 11/2019 | Kadu | |
| 2021/0092461 A1 | 3/2021 | Gadgil | |

FOREIGN PATENT DOCUMENTS

| | | |
|---|---|---|
| EP | 2927865 A1 | 10/2015 |
| EP | 3306563 A1 | 4/2018 |
| WO | 2020061172 | 3/2020 |

OTHER PUBLICATIONS

ITU-R Recommendation ITU-R BT.1886 "Reference Electro-Optical Transfer Function for Flat Panel Displays Used in HDTV Studio Production" Mar. 2011, pp. 1-7.

Luzardo, G. et al "Fully-Automatic Inverse Tone Mapping Preserving the Content Creator's Artistic Intentions" IEEE Picture Coding Symposium, pp. 199-203, Jun. 24, 2018.

SMPTE 2084:2014 "High Dynamic Range Electro-Optical Transfer Function of Mastering Reference Displays" Aug. 16, 2014.

* cited by examiner

MACHINE LEARNING BASED DYNAMIC COMPOSING IN ENHANCED STANDARD DYNAMIC RANGE VIDEO (SDR+)

CROSS-REFERENCE TO RELATED APPLICATIONS

This application claims the benefit of priority from U.S. Patent Application No. 62/781,185 filed Dec. 18, 2018 and European Priority Application No. 18213670.5 filed Dec. 18, 2018 which are hereby incorporated by reference in their entirety.

BACKGROUND

The present invention relates generally to images. More particularly, an embodiment of the present invention relates to machine learning (ML) based dynamic composing in standard dynamic range (SDR) plus enhanced standard dynamic range (SDR+) video contents.

As used herein, the term "dynamic range" (DR) may relate to a capability of the human visual system (HVS) to perceive a range of intensity (e.g., luminance, luma) in an image, e.g., from darkest blacks (darks) to brightest whites (highlights). In this sense, DR relates to a "scene-referred" intensity. DR may also relate to the ability of a display device to adequately or approximately render an intensity range of a particular breadth. In this sense, DR relates to a "display-referred" intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 or more orders of magnitude of the human visual system (HVS). In practice, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable within a scene or image by a human visual system (HVS) that includes eye movements, allowing for some light adaptation changes across the scene or image. As used herein, EDR may relate to a DR that spans 5 to 6 orders of magnitude. Thus while perhaps somewhat narrower in relation to true scene referred HDR, EDR nonetheless represents a wide DR breadth and may also be referred to as HDR.

In practice, images comprise one or more color components (e.g., luma Y and chroma Cb and Cr) of a color space, where each color component is represented by a precision of n-bits per pixel (e.g., n=8). Using non-linear luminance coding (e.g., gamma encoding), images where n≤8 (e.g., color 24-bit JPEG images) are considered images of standard dynamic range, while images where n>8 may be considered images of enhanced dynamic range.

A reference electro-optical transfer function (EOTF) for a given display characterizes the relationship between color values (e.g., luminance) of an input video signal to output screen color values (e.g., screen luminance) produced by the display. For example, ITU Rec. ITU-R BT. 1886, "Reference electro-optical transfer function for flat panel displays used in HDTV studio production," (March 2011), which is incorporated herein by reference in its entirety, defines the reference EOTF for flat panel displays. Given a video stream, information about its EOTF may be embedded in the bitstream as (image) metadata. The term "metadata" herein relates to any auxiliary information transmitted as part of the coded bitstream and assists a decoder to render a decoded image. Such metadata may include, but are not limited to, color space or gamut information, reference display parameters, and auxiliary signal parameters, as those described herein.

The term "PQ" as used herein refers to perceptual luminance amplitude quantization. The human visual system responds to increasing light levels in a very nonlinear way. A human's ability to see a stimulus is affected by the luminance of that stimulus, the size of the stimulus, the spatial frequencies making up the stimulus, and the luminance level that the eyes have adapted to at the particular moment one is viewing the stimulus. In some embodiments, a perceptual quantizer function maps linear input gray levels to output gray levels that better match the contrast sensitivity thresholds in the human visual system. An example PQ mapping function is described in SMPTE ST 2084:2014 "High Dynamic Range EOTF of Mastering Reference Displays" (hereinafter "SMPTE"), which is incorporated herein by reference in its entirety, where given a fixed stimulus size, for every luminance level (e.g., the stimulus level, etc.), a minimum visible contrast step at that luminance level is selected according to the most sensitive adaptation level and the most sensitive spatial frequency (according to HVS models).

Displays that support luminance of 200 to 1,000 cd/m² or nits typify a lower dynamic range (LDR), also referred to as a standard dynamic range (SDR), in relation to EDR (or HDR). EDR content may be displayed on EDR displays that support higher dynamic ranges (e.g., from 1,000 nits to 5,000 nits or more). Such displays may be defined using alternative EOTFs that support high luminance capability (e.g., 0 to 10,000 or more nits). An example of such an EOTF is defined in SMPTE. As appreciated by the inventors here, improved techniques for composing video content data that can be used to support display capabilities of a wide variety of SDR and HDR display devices are desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Machine learning based dynamic composing in enhanced standard dynamic range, also to be referred to as SDR plus (SDR+), video contents is described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to image metadata generation/optimization through machine learning. A plurality of training image pairs comprising a plurality of training SDR image and a plurality of corresponding training HDR images is received. Each training image pair in the plurality of training image pairs comprises a training SDR image in the plurality of training SDR images and a corresponding training HDR image in the plurality of corresponding training HDR images. The training SDR image and the corresponding training HDR image in each such training image pair depict same visual content but with different luminance dynamic ranges. A plurality of training image feature vectors is extracted from a plurality of training SDR images in the plurality of training image pairs. A training image feature vector in the plurality of training image feature vectors is extracted from a training SDR image in a respective training image pair in the plurality of training image pairs. The plurality of training image feature vectors and ground truth derived with the plurality of corresponding training HDR images are used to train one or more backward reshaping metadata prediction models for predicting operational parameter values of backward reshaping mappings used to backward reshape SDR images into mapped HDR images.

Example embodiments described herein relate to image metadata generation/optimization through machine learning. An SDR image to be backward reshaped into a corresponding mapped HDR image is decoded from a video signal. Dynamic composer metadata generated at least in part through machine learning is used to derive one or more operational parameter values of image-specific backward reshaping mappings is decoded from the video signal. The one or more operational parameter values of the image-specific backward reshaping mappings are used to backward reshape the SDR image into the mapped HDR image. A display image derived from the mapped HDR image is caused to be rendered with a display device.

Example Video Delivery Processing Pipeline

Figure 1:
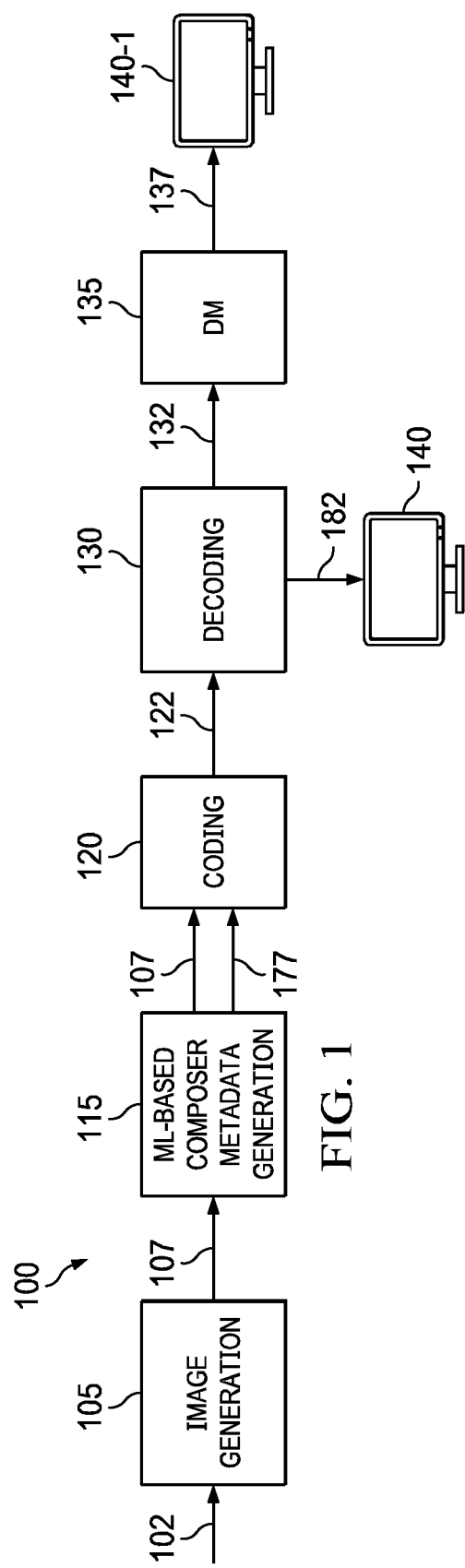
FIG. 1 depicts an example process of a video delivery pipeline.

FIG. 1 depicts an example process of a video delivery pipeline (100) showing various stages from video capture/generation to an HDR or SDR display. Example HDR displays may include, but are not limited to, image displays operating in conjunction with TVs, mobile devices, home theaters, etc. Example SDR displays may include, but are not limited to, SDR TVs, mobile devices, home theater displays, headmounted display devices, wearable display devices, etc.

Video frames (102) is captured or generated using image generation block (105). Video frames (102) may be digitally captured (e.g. by a digital camera) or generated by a computer (e.g. using computer animation, etc.) to provide video data (107). Additionally, optionally or alternatively, video frames (102) may be captured on film by a film camera. The film is converted to a digital format to provide the video data (107). In some embodiments, the video data (107) may be (e.g., automatically with no human input, manually, automatically with human input, etc.) edited or transformed into a sequence of images before being passed to the next processing stage/phase in the video delivery pipeline (100).

The video data (107) may include SDR contents (e.g., SDR+contents, etc.) as well as image metadata that may be used by recipient devices downstream in the video delivery pipeline (100) to perform image processing operations on a decoded version of the SDR video contents.

Example SDR video contents may, but are not necessarily limited to only, be SDR+video contents, SDR images, SDR movie releases, SDR+images, SDR media programs, etc.

As used herein, the term "SDR+" denotes a combination of SDR image data and metadata, which when combined together allow generating corresponding high dynamic range (HDR) image data. SDR+image metadata may include composer data to generate backward reshaping mappings (e.g., a backward reshaping function/curve/polynomial set, multivariate multiple regression (MMR) coefficients, etc.) which when applied to an input SDR image generate a corresponding HDR image. SDR+images allow backwards compatibility with legacy SDR displays which can ignore the SDR+image metadata and simply display the SDR image.

Image metadata transmitted with SDR video contents to a recipient device may include ML composer metadata generated (e.g., automatically, in real time, in offline processing, etc.) under techniques described herein. In some embodiments, the video data (107) (e.g., after SDR content editing or color grading, etc.) is provided to a processor for ML composer metadata generation (115). The ML composer metadata generation (115) may automatically generate ML composer metadata with no or little human interaction. The automatically generated ML composer metadata can be used by recipient device(s) to perform backward reshaping operations for generating corresponding high dynamic range (HDR) images from SDR images in the video data (107).

The ML composer metadata generation (115) can be used to provide one or more valuable services for making video contents available to a wide variety of display devices. One of the valuable services provided by the ML composer metadata generation (115) is to generate the HDR images from the SDR images as mentioned above, in operational scenarios in which HDR images for video content depicted in the SDR images are not available but the SDR images depicting the video content are available. Thus, techniques as described herein can be used to generate or compose HDR video content for HDR displays, in these operational scenarios in which the SDR images are available.

One valuable service provided by the ML composer metadata generation (115) is to generate HDR video content optimized for HDR displays (e.g., entirely, partially, etc.) without relying on some or all of a colorist's manual operations known as "color timing" or "color grading."

Coding block (120) receives the video data (107), the automatically generated ML composer metadata (177), and other image metadata; and encodes the video data (107) with the automatically generated ML composer metadata (177), the other image metadata, etc., into a coded bitstream (122). Example coded bitstreams may include, but are not necessarily limited to, a single layer video signal, etc. In some embodiments, the coding block (120) may comprise audio and video encoders, such as those defined by ATSC, DVB, DVD, Blu-Ray, and other delivery formats, to generate the coded bitstream (122).

The coded bitstream (122) is then delivered downstream to receivers such as decoding and playback devices, media source devices, media streaming client devices, television sets (e.g., smart TVs, etc.), set-top boxes, movie theaters, and the like. In a downstream device, the coded bitstream (122) is decoded by decoding block (130) to generate decoded images 182, which may be similar to or the same as the images (e.g., SDR images, HDR images, etc.) represented in the video data (107) subject to quantization errors generated in compression performed by the coding block (120) and decompression performed by the decoding block (130).

In a non-limiting example, the video signal represented in the coded bitstream (122) may be a backward compatible SDR video signal (e.g., an SDR+video signal, etc.). Here, a "backward compatible video signal" may refer to a video signal that carries SDR images that are optimized (e.g., with specific artistic intent preserved, etc.) for SDR displays.

In some embodiments, the coded bitstream (122) outputted by the coding block (120) may represent an output SDR video signal (e.g., an SDR+video signal, etc.) embedded with image metadata including but not limited to inverse tone mapping metadata, ML composer metadata, the automatically generated ML composer metadata (177), display management (DM) metadata, etc. The automatically generated ML composer metadata (177) specifies backward reshaping mappings that can be used by the downstream decoders to perform backward reshaping on SDR images (e.g., SDR+images, etc.) decoded from the coded bitstream (122) in order to generate backward reshaped images for rendering on an HDR (e.g., target, reference, etc.) display. In some embodiments, the backward reshaped images may be generated from the decoded SDR images using one or more SDR-to-HDR conversion tools implementing the backward reshaping mappings (or inverse tone mappings) as specified in the automatically generated ML composer metadata (177).

As used herein, backward reshaping refers to image processing operations that convert re-quantized images back to the original EOTF domain (e.g., gamma, PQ, hybrid log gamma or HLG, etc.), for further downstream processing, such as the display management. Example backward reshaping operations are described in U.S. Provisional patent application Ser. No. 62/136,402, filed on Mar. 20, 2015, (also published on Jan. 18, 2018, as U.S. patent application Publication Ser. No. 2018/0020224); U.S. Provisional patent application Ser. No. 62/670,086, filed on May 11, 2018, the entire contents of which are hereby incorporated by reference as if fully set forth herein.

Additionally, optionally, or alternatively, the DM metadata in the image metadata can be used by the downstream decoders to perform display management operations on the backward reshaped images generate display images (e.g., HDR display images, etc.) optimized for rendering on the HDR reference display devices, or other display devices such as non-reference HDR display devices, etc.

In operational scenarios in which the receiver operates with (or is attached to) an SDR display 140 that supports the standard dynamic range or a relatively narrow dynamic range, the receiver can render the decoded SDR images directly or indirectly on the target display (140).

In operational scenarios in which the receiver operates with (or is attached to) an HDR display 140-1 that supports a high dynamic range (e.g., 400 nits, 1000 nits, 4000 nits, 10000 nits or more, etc.), the receiver can extract the composer metadata from (e.g., the metadata container in, etc.) the coded bitstream (122) and use the composer metadata to compose HDR images (132), which may be backward reshaped images generated from backward reshaping the SDR images based on the composer metadata. In addition, the receiver can extract the DM metadata from the coded bitstream (122) and apply DM operations (135) on the HDR images (132) based on the DM metadata to generate display images (137) optimized for rendering on the HDR (e.g., non-reference, etc.) display device (140-1) and render the display images (137) on the HDR display device (140-1).

Dynamic Composer Metadata Generation Through Machine Learning

Single Layer Inverse Display Management (SLiDM) or SDR+ can be used to enhance SDR content for rendering on HDR display devices. Luma and chroma channels (or color components) of SDR images may be mapped separately using image metadata to generate corresponding luma and chroma channels of HDR images.

Techniques as described herein can be used to implement a machine learning (ML) based approach of estimating dynamic composer metadata for SDR content. The dynamic composer metadata as generated by this ML based approach improves HDR visual experience as compared with static metadata used in other approaches. The dynamic composer metadata (or ML-based composer metadata) can be infused with different user-defined (e.g., end user selectable, etc.) styles to modify the HDR look based individual users' respective preferences. Additionally, optionally or alternatively, metadata coding syntaxes under techniques as described herein can be used to enable compression of the dynamic composer metadata in (e.g., SDR+, SLiDM, etc.) video signals.

The static metadata in the other approaches specifies a fixed curve (e.g., for some or all SDR images regardless of actual pixel value distributions in the SDR images, etc.) to map SDR luma codewords (e.g., intensities, etc.) to HDR codewords (or intensities). As the same fixed curve is applied to every SDR image (or frame), brightness levels in different scenes/images are not necessarily satisfactorily enhanced in resultant HDR images. For instance, some bright regions in an SDR image might become overly bright in a corresponding HDR image generated by mapping the SDR image with the fixed curve under the other approaches. To get a reliable reproduction of specific artistic intent or visual qualities as represented in the SDR image, the brightness of the image portions in the SDR image should be mapped or enhanced (e.g., from a narrow SDR luminance range to a wide HDR luminance range, etc.) based on the visual content as represented in the SDR image, which cannot be properly supported under the other approaches that use a fixed (mapping) curve.

Likewise, under other approaches, chroma reshaping (e.g., backward reshaping of SDR chroma codewords into HDR chroma codewords, etc.) uses a precomputed set of MMR prediction coefficients. Examples of MMR-based predictors are described in U.S. Pat. No. 8,811,490, which are incorporated by reference in its entirety. The fixed coefficients also tend to overlook subtle dissimilarities in color palettes of different video sequences that depict different visual contents and thus cause different portions of resultant HDR video contents to lose, or fail to reproduce, unique visual qualities and/or distinct color palette identities as represented in corresponding portions of SDR video contents used to generate the HDR video contents. Instead, different portions of the HDR video contents generated by way of the same MMR coefficients tend to acquire a generic look, as there is no freedom to manipulate the fixed MMR coefficients for the different portions of the HDR video contents under the other approaches.

In sharp contrast, under the ML based approach of predicting or estimating HDR luma/chroma codewords, relevant image features (e.g., content dependent features, pixel value dependent features, etc.) can be extracted from SDR image data and used to train, predict and/or estimate (dynamic) ML-based composer metadata for constructing or reconstructing HDR image data from the SDR image data. In some operational scenarios, such construction or reconstruction can be further influenced by user input specifying a user selection of a user-intended visual style/mode.

Training ML prediction models/algorithms/methods under techniques as described herein may be done with a training dataset comprising pairs of SDR and corresponding (e.g., user-desired, manually color graded, etc.) HDR images. The ML prediction models/algorithms/methods can learn (e.g., user-intended, etc.) SDR-to-HDR mappings during the training phase. Machine learnt optimal operational parameters for the ML prediction models/algorithms/methods can be stored persistently or in cache/memory.

The ML prediction models/algorithms/methods can be applied on test SDR content to predict (dynamic) ML-based composer metadata. The (dynamic) ML-based composer metadata (instead of the static or fixed metadata under other approaches) can be outputted or sent to a video decoder for constructing or reconstructing corresponding HDR content and achieving the desired look (e.g., user intended look, preserving specific artistic intent, etc.) in the reconstructed HDR content.

Under techniques as described herein, a multitude of different ML prediction models/algorithms/methods can be learned for various specific user preferences. Then switching among a plurality of different user-preferred HDR looks can be as easily performed under these techniques as switching among the different ML prediction models/algorithms/methods. As a result, SDR content can be backward reshaped into HDR content with desired HDR looks for users without performing costly and complicated manual color grading, thereby providing a cost effective and highly efficient way of generating HDR content with the desired HDR looks for a large number of users. Instead of manually color grading HDR images generated from a potentially vast amount of available SDR content, an individual user can provide a training dataset of pairs of SDR and corresponding (e.g., manually, etc.) color graded HDR images. Machine learned models/algorithms/methods under techniques as described herein can automatically transform any SDR content to corresponding HDR content by mimicking user preferences as embodied by the training dataset.

Luma and Chroma Backward Reshaping

Figure 2A:
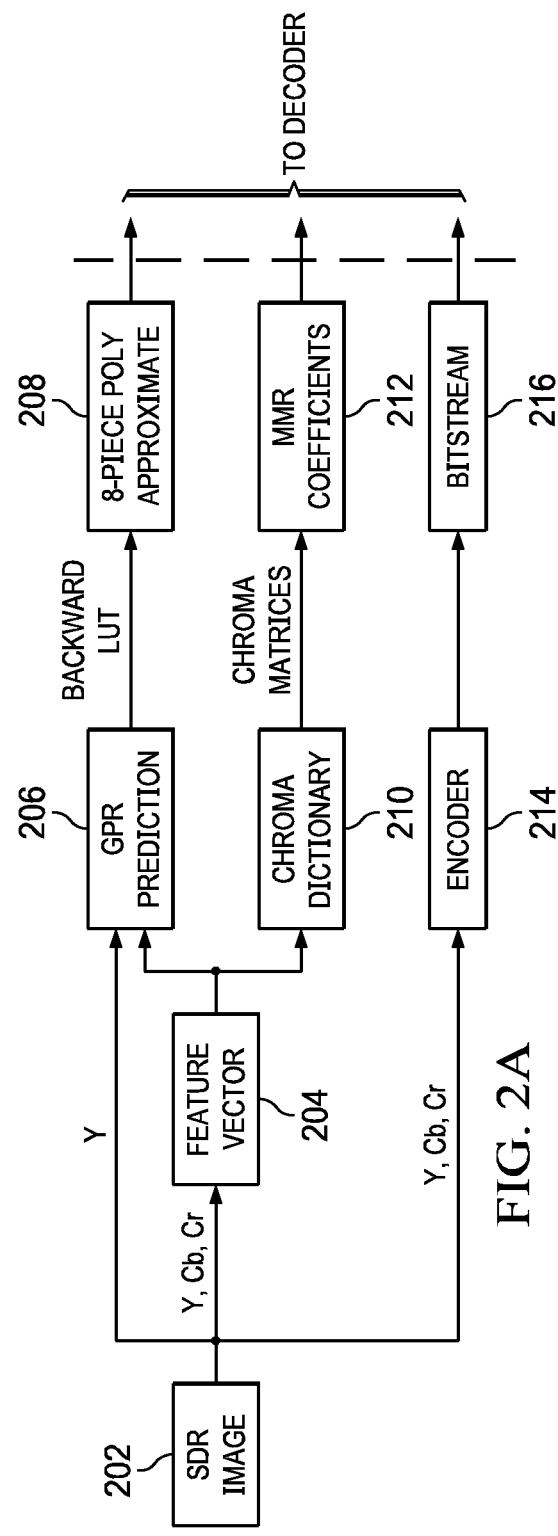
FIG. 2A depicts example prediction/estimation of HDR luma and chroma codewords from SDR luma and chroma codewords.

By way of illustration but not limitation, prediction/estimation of HDR luma and chroma codewords from SDR luma and chroma codewords may be performed in a process flow as illustrated in FIG. 2A using GPR models and chroma dictionaries.

As used herein, regenerating (e.g., predicting, estimating, etc.) HDR luma codewords from SDR luma codewords may be referred to as luma backward reshaping (operations). The SDR luma codewords (e.g., intensities, brightness values, etc.) can be mapped to HDR luma codewords (e.g., intensities, brightness values, etc.) using a backward lookup table (or backward LUT or BLUT) as generated based on the GPR models to carry out the luma backward reshaping. Additionally, optionally or alternatively, regenerating (e.g., predicting, estimating, etc.) HDR chroma codewords from SDR luma and chroma codewords may be referred to as chroma backward reshaping (operations). The SDR luma and chroma codewords can be used to look up in the chroma dictionaries to predict or estimate HDR chroma codewords to carry out the chroma backward reshaping.

The GPR models and chroma dictionaries may be trained with one or more training datasets as described herein in a training phase. More specifically, in the training phase, image features (e.g., content dependent features, etc.) of SDR images (e.g., 202) in the training datasets can be extracted to form feature vectors 204. The image features or the feature vectors (204), together with reference HDR luma codewords (or values) in corresponding HDR images in the training datasets, can be used to train or optimize the GPR models to make GPR-model-based predictions 206 of HDR luma codewords (or values) from SDR luma codewords. The trained GPR models can then be used to generate a backward reshaping curve such as a backward lookup table (or backward LUT). In some embodiments, the backward reshaping curve or the backward LUT may be approximated by an 8-piece polynomial approximation 208. In operational scenarios in which a large set of candidate features is available, feature pruning operations may be performed to reduce the large set of candidate features to a set of features included in a feature vector as described herein. Example feature pruning operations are described in U.S. Provisional patent application Ser. No. 62/733,217, filed on Sep. 19, 2018, the entire contents of which are hereby incorporated by reference as if fully set forth herein.

Additionally, optionally or alternatively, in the training phase, the image features or the feature vectors (204), together with ground truth (or labels) represented by reference HDR luma and chroma codewords (or values) in corresponding HDR images in the training datasets, can be used to train or optimize chroma dictionaries 210 (or MMR mappings) to make chroma-dictionary-based predictions of HDR chroma codewords (or values) from SDR luma and chroma codewords. The trained chroma dictionaries (210) can then be used to generate MMR coefficients 212 (e.g., in chroma matrices defining a mapping from SDR luma and chroma codewords to HDR chroma codewords, etc.) to be used by downstream recipient devices to map SDR luma and chroma codewords into HDR chroma codewords.

In some non-limiting implementation examples, the 8-piece polynomial approximation (208) representing the backward reshaping curve for luma channel Y (or luma color component) and the MMR coefficients (212) representing the backward reshaping mapping for chroma channels Cb and Cr may be encoded by one or more video encoders 214 in one or more image metadata containers of a video signal, separate from encoded video content carried or encoded in the video signal. The 8-piece polynomial approximation (208) and the MMR coefficients (212) can be transmitted as some or all image metadata, along with one or more non-training SDR images (e.g., 202, not in the training datasets, etc.) to downstream decoder(s). The non-training SDR images may be encoded in a base layer or a coded bitstream 216 of the video signal.

During HDR luma reconstruction (e.g., prediction/estimation of HDR luma codewords from SDR luma codewords in the SDR image, etc.), a backward reshaping curve as represented by the backward LUT (or the polynomial approximating the backward LUT) can be used to accept an SDR luma codeword (value) at a (e.g., each, etc.) pixel position of the SDR image as input and generates a corresponding mapped HDR luma codeword (value) at a (e.g., each, etc.) corresponding pixel position (e.g., same row/column, etc.) of a (to be constructed or reconstructed) mapped HDR image as output. Mapped HDR luma codewords (values) for some or all pixel positions of the mapped HDR image can be generated in this manner and used to build the luma channel or luma color component (e.g., among the luma and chroma channels or color components, etc.) of the mapped HDR image, which can then be used to derive an HDR display image for rendering at an image display operating in conjunction with a downstream decoder as described herein.

GPR Based Luma Prediction

Figure 2B:
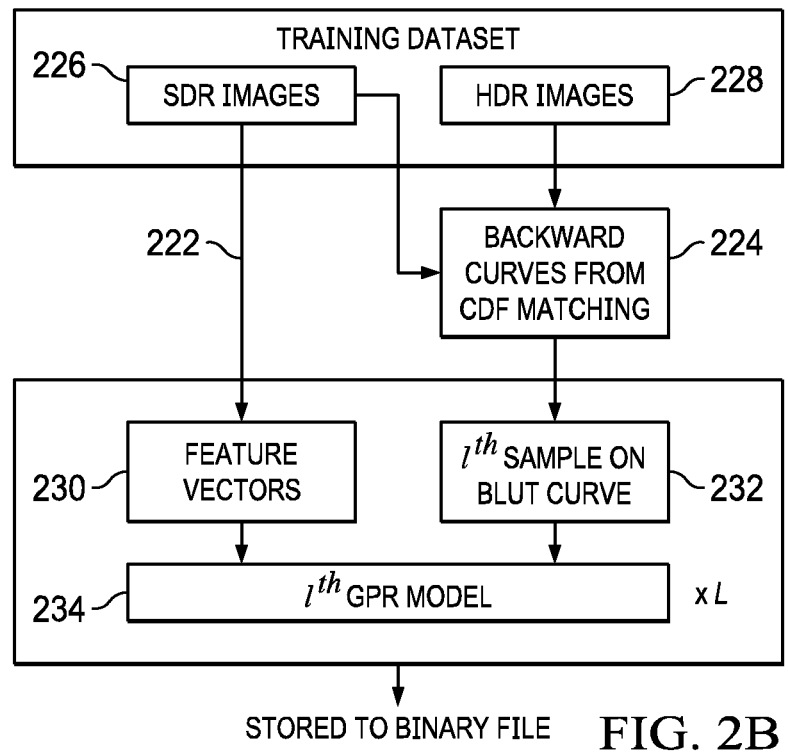
FIG. 2B depicts an example process for training Gaussian Process Regression (GPR) models.

A GPR based process (e.g., flowchart, approach, etc.) as illustrated in FIG. 2B may be used to predict or estimate Q (e.g., distributed, equidistant, non-equidistant, etc.) sample points—with the horizontal axis representing an SDR codeword space comprising all available SDR codewords or values for representing SDR luma codewords or values in actual SDR images; and the vertical axis representing an mapped HDR codeword space comprising mapped HDR codewords or values—on the backward reshaping curve based on input SDR content (e.g., a single SDR image, one or more SDR images, a group of SDR images, some or all of a scene comprising a sequence of SDR images, etc.). The predicted/estimated sample points can then be interpolated and/or extrapolated to construct the entire backward reshaping curve (or BLUT).

The first step (222) of the process as illustrated in FIG. 2B is to extract (e.g., relevant, selected, etc.) image features from input SDR images 226 in the training data set and use the image features to (e.g., reliably, with high confidence, accurately, etc.) predict or estimate the luma backward reshaping curve or the backward LUT.

As illustrated in FIG. 2B, the training datasets comprise the SDR images (226) and corresponding HDR images 228. Each SDR image in the SDR images (226) has, or forms a pair with, a corresponding HDR image in the HDR images 228, thereby forming a plurality of SDR-HDR image pairs in the training data set. An SDR image and a corresponding HDR image in an SDR-HDR (image) pair in the training datasets depict the same image features such as visual objects, persons/characters, visual scenes, visual backgrounds, moving objects such as car, airplanes, etc., but with different (luminance) dynamic range, color gamuts, color precisions, vividness, etc.

The image features may be selected from among a wide variety of image features based on one or more image feature selection factors or criteria such as efficiency of feature vector computation, prediction accuracy, and so forth.

To be viable for large-scale deployment, computational complexity and prediction accuracy should be within acceptable limits (e.g., determined based on user input, determined based on heuristics, determined based on empirical studies of training data, etc.). Based on these acceptable limits (or constraints), one, two or more image feature types may be appropriate (e.g., meeting or satisfying the acceptable limits or constraints, etc.).

By way of example but not limitation, the selected image features may be histogram bin counts in a (e.g., normalized, etc.) luma-chroma combined 1D histogram. The luma-chroma combined 1D histogram and bin counts therein can be used to derive feature vectors 230, which can in turn be used to train the GPR models to produce relatively highly reliable and accurate prediction/estimation results.

Luma and chroma codewords in an input 3-channel (denoted as y, c0 and c1 respectively) SDR video signal (e.g., comprising the SDR images (226) in the training datasets, etc.) into M bins in each channel (or dimension). The normalized—e.g., normalized to a value range of [0, 1]—$i^{th}$ SDR pixel values ($s_{ji}^{y}$, $s_{ji}^{c0}$, $s_{ji}^{c1}$) (or the luma and chroma codewords) at the $j^{th}$ image or frame may be mapped to a cube with an index ($\alpha_{ji}, \beta_{ji}, \gamma_{ij}$) in a 3D histogram, where the index $\alpha_{ji}, \beta_{ji}, \gamma_{ij}$, is given as follows:

$$\alpha_{ji} = \text{round}(s_{ji}^{y} \times M)$$

$$\beta_{ji} = \text{round}(s_{ji}^{c0} \times M)$$

$$\gamma_{ji} = \text{round}(s_{ji}^{c1} \times M) \quad (1)$$

Each 3D cube in the 3D histogram is a triplet representing a respective (after quantization) input value corresponding to an index of the 3D cube. Denote the total number (or count) of pixels in the $j^{th}$ image or frame is P. Pixel values (or luma and chroma codewords) in all F frames (e.g., in the training datasets, etc.) can be collected into F 3D histograms using an example procedure as illustrated in TABLE 1 below.

TABLE 1

// initialization
$h_j^s$ ($\alpha, \beta, \gamma$) = 0 for all cube index ($\alpha, \beta, \gamma$) for each frame j
// scan for each pixel
for each frame j
  for each pixel i in input signal
    find bin index for value ($s_{ji}^{y}$, $s_{ji}^{c0}$, $s_{ji}^{c1}$) as $\alpha_{ji}, \beta_{ji}, \gamma_{ji}$
    $\alpha_{ji}$ = round ($s_{ji}^{y} \times M$), $\beta_{ji}$ = round
    ($s_{ji}^{c0} \times M$) and $\gamma_{ji}$ = round ($s_{ji}^{c1} \times M$)
    $h_j^s$ ($\alpha_{ji}, \beta_{ji}, \gamma_{ji}$) ++
  end
end In some embodiments, final (logarithmic) histograms may be obtained using an example procedure as illustrated in TABLE 2 below.

TABLE 2

// scan for each pixel
for each frame j
  for each cube ($\alpha, \beta, \gamma$ )
    $h_j^s$ ($\alpha, \beta, \gamma$)= log 10($h_j^s$ ($\alpha, \beta, \gamma$) + 1);
  end
end In some embodiment, the luma channel (or dimension) can be partitioned into $M_y$ bins; the two chroma channels (or dimensions) of the 3D histogram can be partitioned into $M_{c0}$ and $M_{C1}$, bins respectively. The normalized $i^{th}$ SDR pixel value ($s_{ji}^y$, $s_{ji}^{c0}$, $s_{ji}^{c1}$) (or luma and chroma codewords) at the $j^{th}$ image or frame can be mapped to the $M_y$ bins for the luma channel (or dimension) with an index $\alpha_{ji}$, to the $M_{c0}$ bins for the $C_0$ chroma channel (or dimension) with an index $\beta_{ji}$, and to $M_{C1}$, bins for the $C_1$ chroma channel (or dimension) histogram bins with an index $\gamma_{ij}$, respectively, where the index $\alpha_{ji}$, $\beta_{ji}$, $\gamma_{ij}$, is given as follows:

$$\alpha_{ji} = \text{round}(s_{ji}^y \times M_y) \tag{2}$$

$$\beta_{ji} = \text{round}(s_{ji}^{c0} \times M_{c0}) \tag{3}$$

$$\gamma_{ji} = \text{round}(s_{ji}^{c1} \times M_{c1}) \tag{4}$$

For each SDR image or frame (e.g., in the SDR images (226), etc.), three separate 1D histograms (one for each channel) are built by counting the total number of pixels in each bin. The process of generating three separate 1D histograms can be repeated for all F images or frames (e.g., in the training datasets, etc.).

Figure 3A:
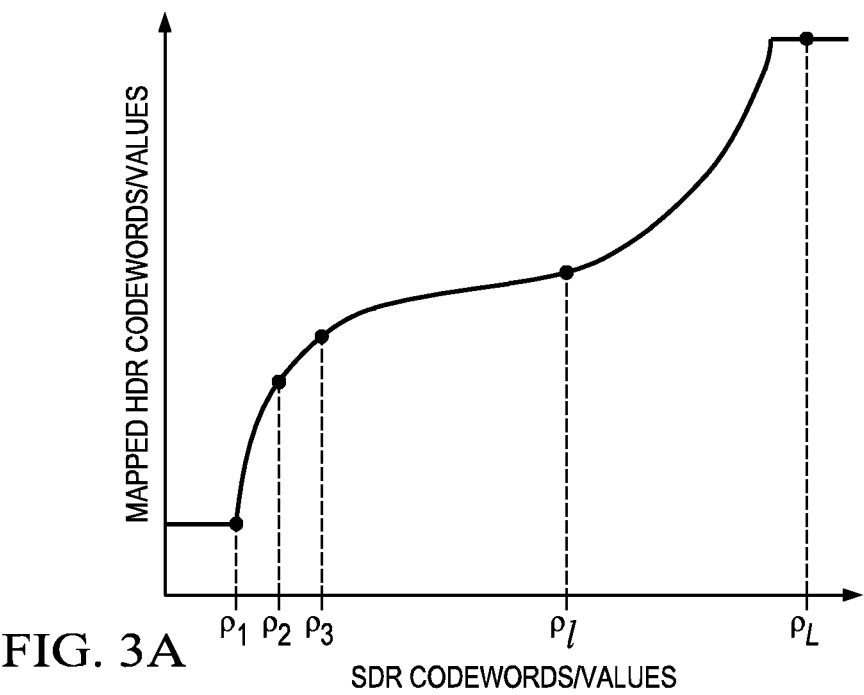
FIG. 3A depicts predicted entries (or samples) of a backward reshaping curve (or BLUT)
Figure 3B:
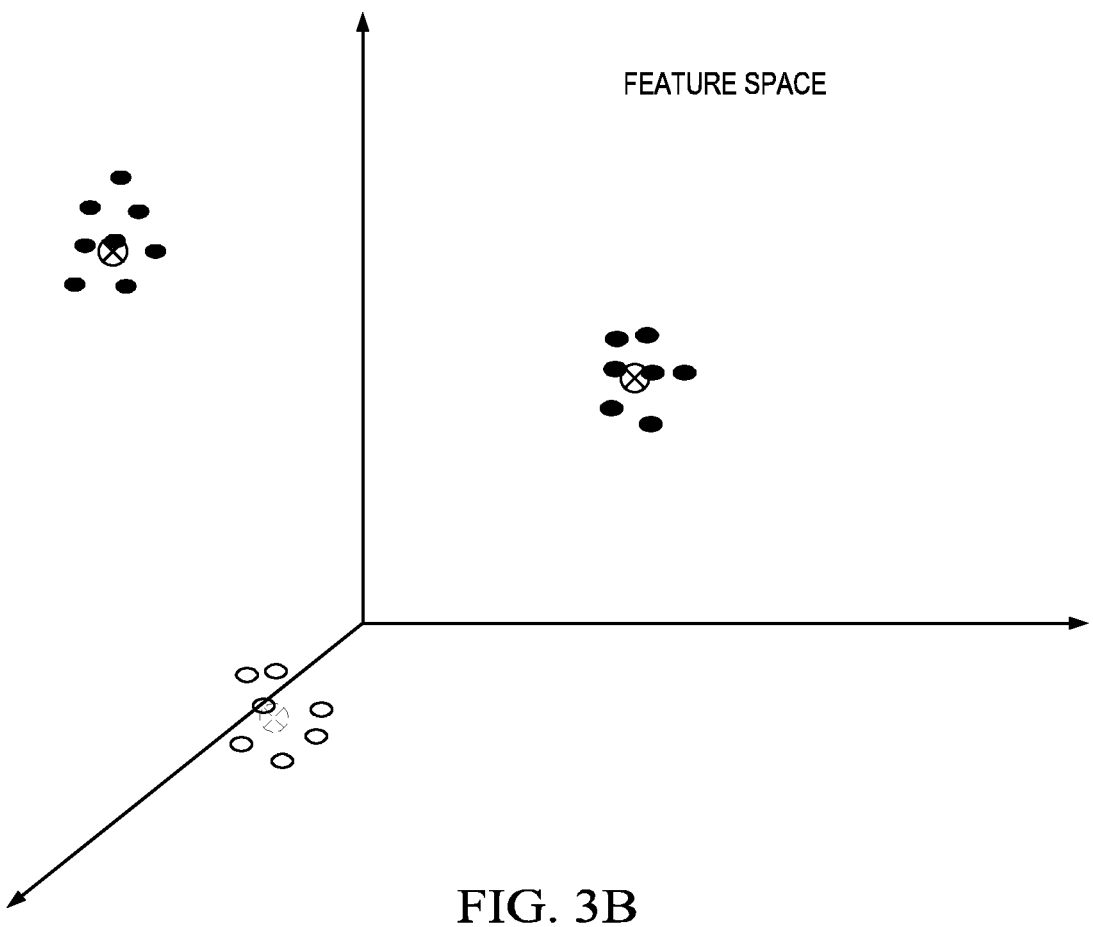
FIG. 3B depicts example clusters of features vectors in a feature vector space.
Figure 3C:
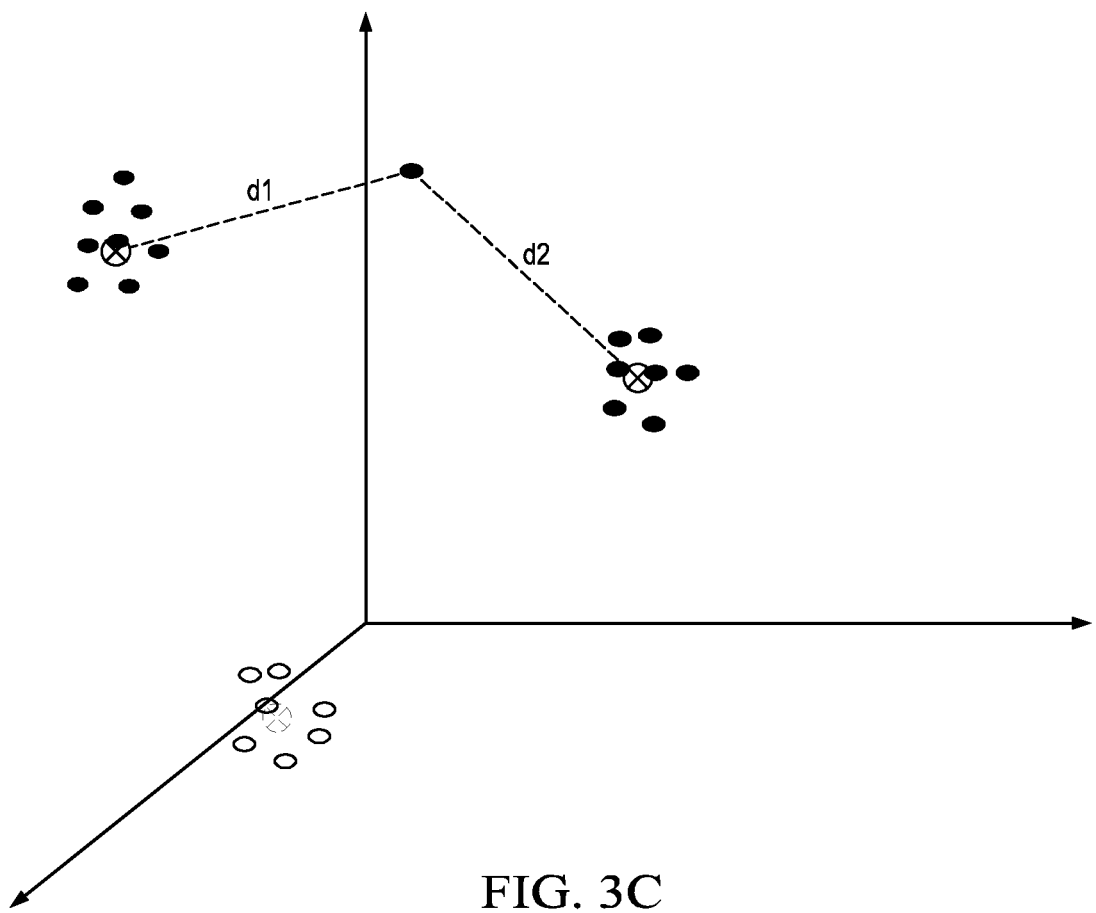
FIG. 3C illustrates example cluster fusion.
Figure 3D:
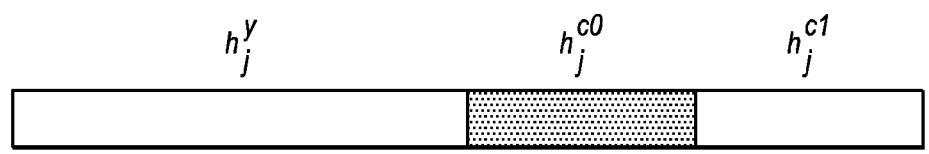
FIG. 3D illustrates an example combined luma-chroma 1D histogram.

The three separate 1D histograms for the three luma and chroma channels may be concatenated to form a combined luma-chroma 1D histogram (denoted as $h_j^{y,c0,c1}(\bullet)$) as illustrated in FIG. 3D, using an example procedure as illustrated in TABLE 3 below.

TABLE 3

```
// initialization
h_j^y (α) = 0, h_j^c0 (β) = 0 and h_j^c1 (γ) = 0
for all bin index (α, β, γ) for each frame j
// scan for each pixel
for each frame j
    for each pixel i in input signal
        find bin index for value (s_ji^y, s_ji^c0, s_ji^c1) as α_ji, β_ji, γ_ji
        α_ji = round (s_ji^y × M_y), β_ji = round (s_ji^c0 × M_c0),
        and γ_ji = round (s_ji^c1 × M_c1)
        h_j^y (α_ji) ++ ; h_j^c0 (β_ji) ++; h_j^c1 (γ_ji) ++
    end
    h_j^{y,c0,c1} = [h_j^y h_j^c0 h_j^c1];
End
```

Each combined luma-chroma 1D histogram may be normalized to remove the effect of varying image dimensions during training or testing of ML models (e.g., GPR models, etc.) as described herein, using an example procedure as illustrated in TABLE 4 below.

TABLE 4

```
// normalization of 1D Histogram
for each frame j
    sum = 0;
    for k = 0 : 1 : K-1
        sum += h_j^{y,c0,c1} (k);
    end
    for k = 0 : 1 : K-1
        h_j^{y,c0,c1} (k) = h_j^{y,c0,c1} (k)/sum;
    end
end
```

Each combined luma-chroma 1D histogram may represent a feature vector (for training or predicting with the GPR models), whose dimension K is given as follows:

$$K = M_y + M_{c0} + M_{c1} \tag{5}$$

As previously noted, the training datasets contain pairs of (training) SDR images (226) and corresponding (e.g., user-desired, manually color graded, etc.) HDR images (228). The second step (224)—which may be executed in any execution order with, such as before, after or at the same time as, the first step (222) as discussed—of the process as illustrated in FIG. 2B is to construct a backward LUT for each pair of a training SDR image and its corresponding HDR image, for example using a method like CDF matching. Example CDF matching operations are described in PCT Application No. PCT/US2017/50980, filed on Sep. 11, 2017; U.S. Provisional application Ser. No. 62/404,307, filed on Oct. 5, 2016, (also published in Apr. 5, 2018, as U.S. patent application Publication Ser. No. 2018/0098094), the entire contents of which are hereby incorporated by reference as if fully set forth herein.

Techniques as described herein can be applied to SDR images of various bit depths such as 8-bit SDR images (e.g., 256 indices in a BLUT, etc.), 10-bit SDR images (e.g., 1024 indices in a BLUT, etc.), and so forth. By way of example but not limitation, for a 10-bit SDR image in an SDR-HDR image pair among F SDR-HDR image pairs in the training datasets, where F is a positive integer greater than one (1), a backward reshaping curve may be represented as a backward LUT in the form of an array of $2^{10} = 1024$ indices (e.g., indexed entries, indexed array elements, etc.). The backward reshaping curve can be sampled at L locations denoted as $\rho$, where L is a positive integer greater than one (1).

In operational scenarios in which L equidistant sample points are used to sample the backward reshaping curve, locations of these equidistant sample points for the backward reshaping curve can be given as follows:

$$\rho_l = \text{round}\left(\frac{l}{L+1} \times 2^{10}\right), \text{ where } l \in [1, L] \tag{6}$$

where l represents a positive integer index for a corresponding sample point in the L equidistant sample points.

HDR values at these L locations of the samples (or sample points) in the backward reshaping curve can be derived as $BLUT_j(\rho_l)$, where $BLUT_j(\bullet)$ denotes the 1024 element array representing the BLUT (or the backward reshaping curve) for the $j^{th}$ SDR-HDR pair (among F SDR-HDR pairs) in the training datasets.

Each (e.g., the l-th HDR value, etc.) of the HDR values $BLUT_j(\rho_l)$ at these L locations of the samples (or sample points) in the backward reshaping curve constitutes, or labels or indicates, a true prediction (e.g., a reference value for prediction/estimation, a ground truth for prediction/estimation, etc.) for a respective sample point (e.g., the l-th sample 232, etc.) of the L sample points of the backward reshaping curve for training a respective GPR model (e.g., the i-th GPR model 234, etc.) in the GPR models (e.g., L GPR models respectively for the L location of the sample points, etc.).

Example values for L (the total number of sampled points for each backward reshaping curve constructed from an SDR-HDR image pair in the training datasets) may include, but are not necessarily limited to only, 10, 15, 20, 25, etc.

Results of training the GPR models using the features vectors (230) and the samples (232) comprising true predictions (e.g., reference values for prediction or estimation, ground truths for prediction or estimation, etc.) of HDR values determined for the L sampling point locations can be stored in (e.g., binary, etc.) file(s), cached in memory, persisted in one or more databases, etc.

To summarize, in some embodiments, for each SDR-HDR pair in the training datasets, a feature vector (230) can be extracted from the SDR image in the SDR-HDR pair; L samples of a backward reshaping curve can be derived by way of a backward LUT constructed from the SDR-HDR pair (e.g., via CDF techniques as mentioned herein, etc.).

Denote the length (or dimension) of the feature vector as K. Denote the bit depth for the SDR image as $B_s$. An example procedure as illustrated in TABLE 5 below can be used to construct a feature vector (or feature matrix) X and a true prediction matrix (which comprises observations or reference values for prediction/estimation of mapped HDR values to be predicted/estimated with the GPR models) y.

TABLE 5

```
X = 0_{K×F}  // initialize training feature matrix
y = 0_{K×F}     // initialize training targeted observation vector
for each frame j among F-frame database
    // for feature matrix
    for k = 0 : 1 : K-1
        X[k, j] = h_j^{y,c0,c1} (k )  // denote x_{k,j} = X[k, j]
    end
    // for observation
    for l = 1 : 1 : L
        ρ_l = round( l/(L+1) × 2^{B_s} )
        y[l, j] = BLUT_j (ρ_l)  // i.e. L equidistant samples
    end
End
```

Training GPR Models

The feature vector matrix X and the observations in the true prediction matrix y can be used to train the GPR models, or learn operational parameters thereof as follows.

A total of L different GPR models can be trained to predict mapped HDR values at the L locations of the sample points. Each GPR model in the GPR models estimates a respective point on a backward reshaping curve at a specific location in the L location. More specifically, the $l^{th}$ GPR model in the L GPR models can be trained to predict or estimate the $\rho_l^{th}$ entry of a backward LUT representing the backward reshaping curve, where $l \in [1, L]$. Predicted entries (or samples) of the backward reshaping curve (or backward LUT) are illustrated as points with circles in FIG. 3A.

For illustration purposes, consider the $l^{th}$ GPR model used to predict or estimate the l-th value of the backward reshaping curve at the $\rho_l^{th}$ location. Denote $p^{th}$ and $q^{th}$ training vectors (where $p,q \in [0, F-1]$), among the total number F of training vectors in the dataset, as $x_1$ and $x_q$ respectively. Denote a kernel function representing a kernelized distance between these two vectors as $r_l(x_1, x_q)$. Denote a corresponding weight as $w_{l,q}$. Then a prediction $\hat{y}[l, p]$ from the $l^{th}$ GPR model based on all F feature vectors may be formulated as follows:

$$\hat{y}[l, p] = \sum_{q=0}^{F-1} w_{l,q} \cdot r_l(x_p, x_q) \quad (7)$$

The training phase can be used to tune operational parameters of the kernel function and weights used to make the prediction $\hat{y}[l, p]$ such that prediction errors are minimized, as follows:

$$\min \sum_{p=0}^{F} (y[l, p] - \hat{y}[l, p])^2 \quad (8)$$

An example rational quadratic (RQ) kernel $r_l(x_1, x_q)$ to be used in expressions (7) and (8) may take the following form:

$$r_l(x_p, x_q) = \sigma_{l,f}^2 \left( 1 + \frac{\sum_{k=0}^{K-1}(x_{p,k} - x_{q,k})^2}{2\alpha_l d_l^2} \right)^{-\alpha_l} \quad (9)$$

During the training phase, the following operational parameters can be learned or optimized: hyperparameter $\theta_l = \{\sigma_{l,f}, \alpha_l, d_l,\}$ of the kernel in expression (9); $\{w_{l,q}\}$: weighting factors (F weighting factors corresponding to F feature vectors) for the l-th GPR model in expression (7).

After the operational parameters are learned or optimized, then the l-th GPR model can be applied or used to predict the corresponding value for any (e.g., unseen, to-be-predicted, to be-estimated, test, etc.) feature vector x̃ extracted from any SDR image, as follows:

$$\hat{y}[l] = \sum_{q=0}^{F-1} w_{l,q} \cdot r_l(\hat{x}, x_q) \quad (10)$$

The foregoing operations can be applied or repeated to train all of the L GPR models to learn or optimize respective operational parameters in these GPR models, each of which has its own set of kernel operational parameters and weights (or weight factors).

Testing GPR Models

A testing phase may be used to build up (test) feature vectors from (test) SDR images, for example with the same or identical feature types used in training features vectors, and then construct samples in a backward reshaping curve (or a corresponding backward LUT) using the trained GPR models. These samples can then be interpolated and/or extrapolated to generate the entire backward reshaping curve (or the entire BLUT). CDF matching can be performed with the generated BLUT to ensure a resultant BLUT to be smooth and monotonically non-decreasing.

Figure 2C:
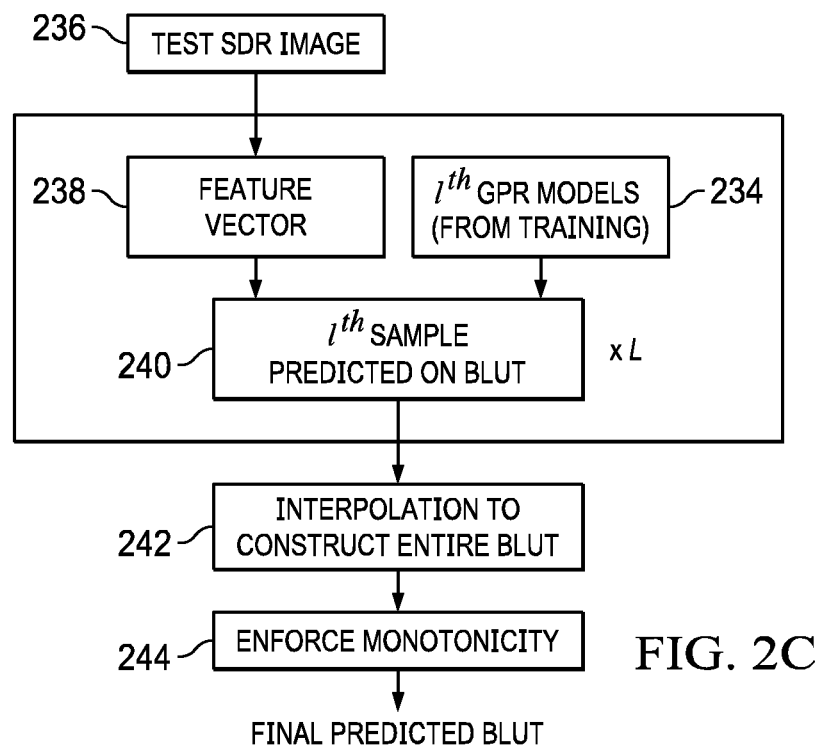
FIG. 2C depicts an example process for generating a backward lookup table (BLUT) from GPR models.

As illustrated in FIG. 2C, (test) image features may be extracted from input (test) SDR image 236, similar to the first step (222) of FIG. 2B. By way of example, a (test) feature vector (denoted as x̃) 238 may be extracted from the SDR image (236) and represented as a combined luma-chroma 1D histogram with histogram bins as image features. In various operational scenarios, feature vectors such as the (test) feature vector x̃(238) can be extracted from input SDR images in some or all of a scene, in some or all of a group of pictures, in some or all of a time sequence of images or frames, etc. Each of the feature vectors may be normalized so that all elements in the feature vector add up to unity (1).

The (test) feature vector x̃(238 of FIG. 2C) can be used with the trained l-th GPR model (234 of FIG. 2C) to predict or estimate the l-th sample (240 of FIG. 2C) or the l-th mapped HDR value on a backward reshaping curve to be used to reshape the (test) SDR image into a mapped HDR image. This can be repeated for predicting or estimating samples for all L locations on the backward reshaping curve.

The prediction for the $l^{th}$ sample (240) (or the l-th HDR value) on the backward reshaping curve based on the l-th GPR model (234) is given as follows:

$$\hat{y}[l] = \sum_{q=0}^{F-1} w_{l,q} \cdot r_l(\hat{x}, x_q) \quad (11)$$

Similarly, other values of the backward LUT can be predicted or estimated using corresponding GPR models. As a result, L samples or points can be predicted or estimated on the backward reshaping curve, as follows:

$$BLUT(\rho_l)=\hat{y}[l] \quad (12)$$

The entries (e.g., 1024 entries) of the array defining or specifying the BLUT can be filled in through interpolation (242 of FIG. 2C).

In some operational scenarios, static BLUT (used to map SDR images regardless of actual pixel value distributions or actual visual content in the SDR images) and dynamic BLUT (e.g., generated individually for each SDR image based on respective image features of the SDR image, etc.) may be merged.

For example, samples of backward LUT predicted/estimated from the GPR models may have be slightly higher than expected values in the dark regions of the mapped HDR image. This may lead to a problem or visual artifact of elevated black levels in the reconstructed HDR image, especially around letterbox regions and black frames present in the reconstructed HDR image. To get rid of this problem or visual artifact, the static backward LUT can be merged with a dynamic BLUT predicted/estimated from the GPR models in the dark regions. In some embodiments, the predicted value of the GPR model are replaced with values from the static BLUT from the first point (e.g., the darkest point, etc.) onwards using collocated index locations, as follows:

$$BLUT(92_l)=\text{static\_BLUT}(\rho_l) \text{ for } l \in [1,\chi] \quad (13)$$

where $\chi$ represents a threshold index value below which the static BLUT value is used, and may be set to 2, 3, etc., not exceed [L/2] in some embodiment. The static_BLUT($\bullet$) represents the static BLUT.

Linear interpolation (242 of FIG. 2C) may be used or applied to construct the entire BLUT by filling in all the missing values in the BLUT($\bullet$). Given samples values of the BLUT at the locations $\rho_l$ for $l \in [1\ L]$, the first and the last values of the BLUT can be populated as follows:

$$BLUT(0)=BLUT(\rho_l)=\hat{y}[1]$$

$$BLUT(2^B,-1)=BLUT(\rho_L)=\hat{y}[L] \quad (14)$$

The remaining missing values in the BLUT can be interpolated using linear interpolation (242 of FIG. 2C). For any BLUT index $\zeta$ (where $\zeta \in [1, 2^B, -2]$ is the integer index), the nearest points to the entry that is located at the BLUT index can be first determined. Suppose the location $\zeta$ lies between l and l+1. Then the value of the BLUT entry located at the BLUT index $\zeta$ can be computed as follows:

$$BLUT(\varsigma) = BLUT(\rho_l) + \{\varsigma - \rho_l\} \times \frac{BLUT(\rho_{l+1}) - BLUT(\rho_l)}{\frac{1}{L+1} \times 2^{B_s}} \quad (15)$$

Or equivalently the value of the BLUT entry located at the BLUT index $\zeta$ can be given as follows:

$$BLUT(\varsigma) = \hat{y}[l] + \{\varsigma - \rho_l\} \times \frac{\hat{y}[l+1] - \hat{y}[l]}{\frac{1}{L+1} \times 2^{B_s}} \quad (16)$$

After linear interpolation, all indexed entries in the entire BLUT may be obtained or generated.

A monotonically non-decreasing condition may be enforced (244 of FIG. 2C) on the BLUT. This condition can be enforced at least at two different times. In a first non-limiting example, the monotonically non-decreasing condition may be enforced before linear interpolation. For example, if prediction/estimation of a l-th mapped HDR value from the $l^{th}$ GPR model is smaller than prediction of estimation of a (l–1)-th mapped HDR value from the (l–1)-th GPR model, then the prediction of estimation of the (l–1)-th mapped HDR value from the (l–1)-th GPR model can be copied as the prediction/estimation of the l-th mapped HDR value regardless of what being predicted/estimated from the $l^{th}$ GPR model, as illustrated in an example procedure shown in TABLE 6 below.

TABLE 6

// enforce monotonically non-decreasing condition on the backward LUT
for l= 2 : 1 : L
  if $\hat{y}$[l] < $\hat{y}$[l–1]
    $\hat{y}$[l] = $\hat{y}$[l–1];
  end
end In a second non-limiting example, the monotonically non-decreasing condition may be enforced before linear interpolation or after linear interpolation. The BLUT and the normalized SDR histogram can be used to predict an HDR histogram distribution. The SDR histogram obtained from the test SDR image and the predicted HDR distribution can be fed as input to CDF matching operations to generate a monotonically non-decreasing, smooth backward reshaping curve. Example CDF matching to ensure a backward reshaping curve to be monotonically non-decreasing are described in the previously mentioned PCT Application No. PCT/US2017/50980.

One or both of the above-described methods to enforce a constrain of a monotonically non-decreasing condition can be used. In addition to providing monotonicity, CDF matching may be used to produce a relatively smooth backward reshaping curve conducive for (e.g., an 8-piece, etc.) polynomial approximation.

In some operational scenarios, the (e.g., final, predicted, etc.) backward LUT may be approximated with an 8-piece second-order polynomial. Operational parameters specifying the polynomials may then be sent to downstream decoder(s) for reconstructing HDR luma codewords in mapped HDR images and for rendering the mapped HDR images at an image display.

Dictionary Based Chroma Prediction

In some operational scenarios, luma mapping (or luma backward shaping) uses a single luma channel (e.g., "Y", etc.) of SDR video content for prediction or estimation of a corresponding luma channel of mapped or reconstructed HDR video content, whereas chroma mapping (or chroma backward reshaping) uses all three luma and chroma channels (e.g., "Y", "Cb"/"C0" and "Cr"/"C1", etc.) of the SDR video content for prediction or estimation of chroma channels of the mapped or reconstructed HDR video content. Additionally, optionally or alternatively, the chroma mapping may be implemented or performed as a chroma prediction process using a pre-trained chroma dictionary.

A chroma dictionary prediction approach as described herein may begin with extracting feature vectors from SDR images in one or more training datasets. For similar reasons, this approach can work relatively efficiently with luma-chroma combined 1D histogram features as previously discussed. In addition, using the same (image) features in the chroma mapping as in the luma mapping enables sharing or reusing of the computed feature vectors with relatively high computational efficiency.

Figure 2D:
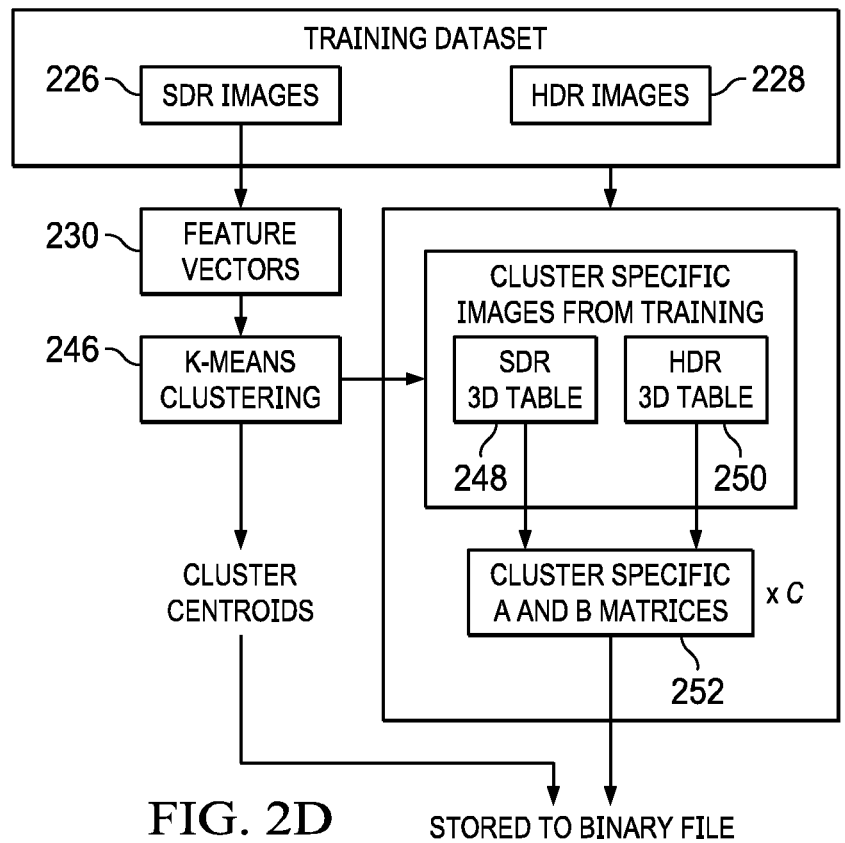
FIG. 2D depicts an example process for training cluster-specific multivariate multiple regression (MMR) matrices.

More specifically, as illustrated in FIG. 2D, luma-chroma combined 1D feature vectors 230 (which may be the same as 230 of FIG. 2C) are extracted from each SDR image in (training) SDR images 226 (which may be the same as 226 of FIG. 2C) in the training datasets which also comprises corresponding (training) HDR images 228 (which may be the same as 228 of FIG. 2C).

The feature vectors can be fed to a clustering algorithm/method (e.g., to generate a fixed number of such as 64 clusters, to generate a non-fixed, automatically determined, number of clusters, minimizing intra-cluster distances while maximizing inter-cluster distances, etc.) to group similar images/frames together. A motivation behind clustering is to group frames with similar image or visual characteristics into the same relatively homogeneous cluster. For such a relatively homogeneous cluster, the same backward chroma mapping—or an SDR-to-HDR chroma mapping captured or characterized effectively by A and B matrices to be further explained in detail—may be (e.g., completely, sufficiently, adequately, etc.) consistent for applying to all the frames in the cluster. As a result, only a single set of A and B matrices can be computed for each such cluster. The same set of A and B matrices can be used to capture the same or similar essence of SDR to HDR chroma mapping for all the images/frames belonging to that cluster.

As illustrated in FIG. 2D, (e.g., all, etc.) the feature vectors (230) can be pooled together and then grouped or partitioned into P clusters, for example automatically or programmatically by a clustering algorithm/method including but not limited to a k-means clustering algorithm 246.

The clusters of feature vectors can be viewed as representing a collection of corresponding clusters of images/frames with similar luma and chroma pixel value distributions. Images/frames that gives rise to a cluster of feature vector among the clusters of feature vectors are deemed or considered to be belonging to the same cluster of images/frames, which can be subjected to the same or similar SDR to HDR chroma channel mappings (chroma backward mapping).

A cluster centroid for a cluster of feature vector (or the corresponding cluster of images/frames) may be evaluated by taking an arithmetic mean (e.g., multi-dimensional average, etc.) of all feature vectors belonging to that cluster.

An example procedure for clustering feature vectors and computing respective centroids of the clusters of feature vectors is illustrated in TABLE 7 below.

TABLE 7

```
// initialize the elements to zero
for c = 0 : 1 : C-1
    for k = 0 : 1 : K-1
        Ψ_c(k) = 0 ;
    end
end
// cluster centroid
for each frame j ∈ Φ_c // for each cluster c, let Φ_c be the set of SDR
and HDR
                      // image/frames that are clustered to the cluster (c)
    for k = 0 : 1 : K-1
```

$$\Psi_c(k) = \Psi_c(k) + \frac{h_j^{y,c0,c1}(k)}{|\Phi_c|} //\Psi_c(\bullet)$$

```
    is K-dimensional centroid for c^th cluster
    end
end
```

FIG. 3B illustrates example clusters of features vectors in a feature vector space as generated by applying an automatic k-means clustering algorithm/method. The feature vectors are represented by small circles and aggregated into their specific clusters. Respective cluster centroids of the clusters of feature vectors are represented by crosses circumscribed by large circles.

For the $c^{th}$ cluster of feature vectors (or the $c^{th}$ cluster of images/frames corresponding or giving rise to the $c^{th}$ cluster of feature vectors), $A_c$ and $B_c$ matrices—which are the A and B matrices for the $c^{th}$ cluster of images/frames corresponding or giving rise to the $c^{th}$ cluster of feature vectors—may be computed using 3DMT based MMR and SDR-HDR image pairs in the c* cluster of images/frames. These matrices $A_c$, $B_c$ and the $c^{th}$ cluster centroid together constitute a cluster-specific portion of a (pre-trained) chroma dictionary for the $c^{th}$ cluster.

Chroma backward reshaping may be performed at the decoder side with MMR coefficients derived from a (cluster-specific) set of A and B matrices, which set is computed or trained separately for each cluster with 3-dimensional mapping tables (3DMTs) during the training phase for chroma mapping.

Let triplets $(s_{ji}^y, s_{ji}^{c0}, s_{ji}^{c1})$ and $(v_{ji}^y, v_{ji}^{c0}, v_{ji}^{c1})$ represent normalized Y, $C_0$ and $C_1$ values for the $i^{th}$ pixel in the $j^{th}$ SDR and HDR images/frames respectively. The Y, $C_0$ and $C_1$ codeword (or pixel value) ranges of an SDR codeword space (or an SDR domain) can be partitioned into $Q_y$, $Q_{c_0}$, $Q_{c_1}$ bins respectively. A 3D table $\Omega^s$, (248 of FIG. 2D), having $Q_y \times Q_{c_0} \times Q_{c_1}$ dimensions, can be constructed for the $j^{th}$ SDR image/frame. Each entry in this 3D table $\Omega^s$ may be represented as a 3-element vector which is initialized to zeros or [0 0 0]. After this initialization, each pixel in the $j^{th}$ SDR image/frame can be stepped through to determine a corresponding bin (or bin association) $t=(q_y, q_{c_0}, q_{c_1})$ to which each such pixel belongs to.

A bin association t of each pixel in the $j^{th}$ SDR image/frame can be found as follows:

$$q_y = [s_{ji}^y \times Q_y]$$

$$q_{c0} = [s_{ji}^{c0} \times Q_{c0}]$$

$$q_{c1} = [s_{ji}^{c1} \times Q_{c1}] \quad (17)$$

This bin association t may be applied to establish BOTH a bin association of an SDR pixel in the $j^{th}$ SDR image/frame AND a bin association of a corresponding HDR pixel in the $j^{th}$ HDR image/frame. More specifically, the HDR pixel in the $j^{th}$ HDR image/frame may correspond to the SDR pixel in the $j^{th}$ SDR image/frame, in terms of the same pixel location, having a common/shared set of pixel row and pixel column indexes, etc. The HDR pixel in the $j^{th}$ HDR image/frame is counted into an HDR pixel count in a bin of an HDR 3D table (250 of FIG. 2D) with the same bin association t (or the same bin indexes as shown in expression (17)) as a bin of the SDR 3D table (248 of FIG. 2D) with the same bin association t (or the same bin indexes as shown in expression (17)).

Thus, $\Omega_j^s(t)$ accumulates the Y, $C_0$ and $C_1$ values for all SDR pixels in the $j^{th}$ SDR image/frame that map to the $t^{th}$ bin, which may be mathematically represented as follows:

$$\Omega_j^s(t) = \sum_{i \in t} \begin{bmatrix} s_{ji}^y & s_{ji}^{c0} & s_{ji}^{c1} \end{bmatrix} \text{ for pixels in } j^{th} \text{ SDR frame} \quad (18)$$

The SDR 3D table (248 of FIG. 2D) can be constructed as a 3D histogram $\pi$, (which denotes the histogram rather than multiplication operation) for the $j^{th}$ SDR image/frame, where each bin with the bin association t in the 3D histogram $\pi$, is used to store the number of SDR pixels in the $j^{th}$ SDR image/frame that are mapped to the $t^{th}$ bin as illustrated in expression (18) above, as follows:

$$\pi_j(t) = \Sigma I(i \in t) \text{ for pixels in the } j^{th} \text{ SDR image/frame} \quad (19)$$

where $I(\bullet)$ in the above equation represents the identity function that yields one if the i-th pixel belongs to the bin with the bin association t.

Similarly, the HDR 3D table $\Omega_j^v$ (250 of FIG. 2D) in HDR domain can be constructed to aggregate Y, $C_0$ and $C_1$ values for all HDR pixels in the $j^{th}$ HDR image/frame that map to the $t^{th}$ bin as follows:

$$\Omega_j^v(t) = \sum_{i \in t} \begin{bmatrix} v_{ji}^y & v_{ji}^{c0} & v_{ji}^{c1} \end{bmatrix} \quad (20)$$

for pixels in the $j^{th}$ HDR image/frame

For each cluster c, let $\Phi_c$ be the set of SDR and HDR image/frames that are clustered to the cluster (c). Cluster specific SDR and HDR 3D tables $\Omega_c^s$ and $\Omega_c^v$ (248 and 250 of FIG. 2D) can be constructed as 3D histograms $\pi_c$, where p stands for an image/frame belonging to the cluster (or $p \in \Phi_c$, as follows:

$$\Omega_c^s(t) = \sum_{p \in \Phi_c} \Omega_p^s(t) \quad (21)$$

$$\prod_c(t) = \sum_{p \in \Phi_c} \prod_p(t)$$

$$\Omega_c^v(t) = \sum_{p \in \Phi_c} \Omega_p^v(t)$$

Non-zero entries in the 3D tables $\Omega_c^s$ and $Q_c^v$ may be normalized or averaged out by dividing with the total number of pixels in the bins with the same bin association across all images in the cluster (c). This makes all elements (each element corresponding to a respective channel or color component) of the 3D vector in $\Omega_c^s(t)$ to be within the range [0,1], which may be mathematically represented as follows:

$$\Omega_c^s(t) = \Omega_c^s(t)/\pi_c(t)$$

$$\Omega_c^s(t) = \Omega_c^s(t)/\pi_c(t) \quad (21)$$

The SDR and HDR 3D tables (248 and 250 of FIG. 2D) can then be used to build $A_c$ and $B_c$ matrices for that specific cluster (c).

Let $[s_{t,c}^y, s_{t,c}^{c0}, s_{t,c}^{c1}]$ denote a 3D (normalized or averaged out) SDR vector in the $t^{th}$ bin of Q, where all elements of the SDR triplet may be normalized or averaged out (e.g., $s_{t,c}^y, s_{t,c}^{c0}, s_{t,c}^{c1} \in [0,1]$, etc.). Let $[v_{t,c}^y, v_{t,c}^{c0}, v_{t,c}^{c1}]$ denote a 3D (normalized or averaged out) HDR vector in the $t^{th}$ bin of $\Omega_c^v$, corresponding (normalized or averaged out) HDR pixels corresponding to the SDR pixels counted into the $t^{th}$ bin of $\Omega_c^s$ are counted or stored.

To predict HDR chroma codewords/values from SDR luma and chroma codewords, a vector may be first constructed as follows:

$$g_{t,c} = [1 \, s_{t,c}^y \, s_{t,c}^{c0} \, s_{t,c}^{c1} \, s_{t,c}^y \cdot s_{t,c}^{c0} \, s_{t,c}^y \cdot s_{t,c}^{c1} \, s_{t,c}^{c0} \cdot s_{t,c}^{c1} \, s_{t,c}^y \cdot$$
$$s_{t,c}^{c0} \cdot s_{t,c}^{c1} (s_{t,c}^y)^2 (s_{t,c}^{c0})^2 (s_{t,c}^{c1})^2 (s_{t,c}^y \cdot s_{t,c}^{c0})^2$$
$$(s_{t,c}^y \cdot s_{t,c}^{c1})^2 (s_{t,c}^{c0} \cdot s_{t,c}^{c1})^2 (s_{t,c}^y \cdot s_{t,c}^{c0} \cdot s_{t,c}^{c1})^2] \quad (22)$$

The corresponding MMR coefficients for the $C_0$ and $C_1$ channels may represented by the following (e.g., transpositions of, superscript "T" below stands for vector transposition, etc.) vectors:

$$u_c^{c0} = [u_{0,c}^{c0} u_{1,c}^{c0} \ldots u_{R-1,c}^{c0}]^T$$

$$u_c^{c1} = [u_{0,c}^{c1} u_{1,c}^{c1} \ldots u_{R-1,c}^{c1}]^T \quad (23)$$

where R stands for the dimension of the vector in expression (22) above. For the vector to include second order MMR coefficients, R=15. The predicted value $\hat{v}_{t,c}^{c0}$ and $\hat{v}_{t,c}^{c1}$ can be obtained as follows:

$$\hat{v}_{t,c}^{c0} = g_{t,c} \cdot u_c^{c0}$$

$$\hat{v}_{t,c}^{c1} = g_{t,c} \cdot u_c^{c1} \quad (24)$$

Let $W_c$ denote the total number of non-zero bins in the 3D table/matrix $\Omega_c^s$. The vectors of expected HDR chroma values $\hat{v}_{t,c}^{c0}$, $\hat{v}_{t,c}^{c1}$ and a consolidated matrix $G_c$ of SDR values or terms as illustrated in expression (22) can be constructed or written as follows:

$$\hat{v}_c^{c0} = \begin{bmatrix} \hat{v}_{0,c}^{c0} \\ \hat{v}_{1,c}^{c0} \\ \vdots \\ \hat{v}_{W_c-1,c}^{c0} \end{bmatrix}, \hat{v}_c^{c1} = \begin{bmatrix} \hat{v}_{0,c}^{c1} \\ \hat{v}_{1,c}^{c1} \\ \vdots \\ \hat{v}_{W_c-1,c}^{c1} \end{bmatrix} \text{ and } G_c = \begin{bmatrix} g_{0,c} \\ g_{1,c} \\ \vdots \\ g_{W_c-1,c} \end{bmatrix} \quad (25)$$

Similarly, (e.g., target, reference, etc.) vectors of ground truth HDR values $v_c^{c0}$, $v_c^{c0}$ can be constructed or written as follows:

$$v_c^{c0} = \begin{bmatrix} \hat{v}_{0,c}^{c0} \\ \hat{v}_{1,c}^{c0} \\ \vdots \\ \hat{v}_{W_c-1,c}^{c0} \end{bmatrix}, v_c^{c1} = \begin{bmatrix} \hat{v}_{0,c}^{c0} \\ \hat{v}_{1,c}^{c0} \\ \vdots \\ \hat{v}_{W_c-1,c}^{c0} \end{bmatrix} \quad (26)$$

The A and B matrices, or MMR coefficients therein, for chroma mapping (or chroma backward reshaping) may be determined by solving an optimization problem to minimize an overall approximation error for all bins as illustrated in TABLE 8.

TABLE 8

| For channel c0: | $\min_{u_c^{c0}} \|v_c^{c0} - \hat{v}_c^{c0}\|^2$ |
|---|---|
| For channel c1: | $\min_{u_c^{c1}} \|v_c^{c1} - \hat{v}_c^{c1}\|^2$ |

The optimization problem can be solved with a linear least squared solution as follows:

$$u_c^{c0,opt} = ((G_c)^T G_c)^{-1}((G_c)^T v_c^{c1})$$

$$u_c^{c1,opt} = ((G_c)^T G_c)^{-1}((G_c)^T v_c^{c1}) \quad (27)$$

In expressions (27) above, let:

$$A_c = G_c^T G_c$$

$$B_c^{c0} = G_c^T v_c^{c0}$$

$$B_c^{c1} = G_c^T v_c^{c1} \quad (28)$$

These matrices in expressions (28) form a cluster-specific set of A and B matrices computed for each cluster (c)

separately. This cluster-specific set of A and B matrices together with a cluster centroid computed for the cluster (c) form a cluster-specific portion of a chroma dictionary for performing chroma mapping on images with image characteristics or feature vectors the same as or similar to image characteristics or feature vectors of the cluster (c). More explicitly, the chroma dictionary comprises or stores components as follows: A, $B^{c0}$ and $B^{c1}$ for each cluster, and a cluster centroid $\Psi_c(\bullet)$ for each cluster, of all the clusters of feature vectors (e.g., a total number C of clusters, etc.).

The chroma dictionary including (e.g., a plurality of sets of, etc.) machine learnt cluster-specific A and B matrices, or MMR coefficients therein, and respective cluster centroids can be stored persistently or in cache/memory and used as a basis for chroma prediction operations. Additionally, optionally or alternatively, in operational scenarios in which multiple training datasets—each of which may provide a respective user-desired style or HDR look—are used to train GPR models and chroma dictionaries as described herein, each of the multiple training datasets can be auto-clustered into (e.g., a plurality of, etc.) clusters and used to derive a respective chroma dictionary comprising (e.g., a plurality of sets of, etc.) machine learnt cluster-specific A and B matrices, or MMR coefficients therein, and respective cluster centroids, thereby giving rise to multiple chroma dictionaries respectively corresponding to (or trained by) the multiple training datasets. These chroma dictionaries may be stored persistently or in cache/memory and used as bases for chroma prediction operations.

Testing Chroma Mapping

A testing phase of the chroma dictionary approach may be performed without being dependent on accessing a corresponding HDR image. The testing phase can be implemented or performed to compute a feature vector (e.g., for example with the same or identical feature types used in training features vectors, etc.) on a test SDR image and compare the feature vector against all the cluster centroids of all the clusters to find the closest cluster, or two or more closest clusters. A and B matrices of the closest cluster or the two or more closest clusters can be used to compute (e.g., combine in the case of more than one closest cluster is used, etc.) or derive MMR coefficients for that test SDR image. The derived MMR coefficients for the test SDR image can be used (e.g., by a decoder, etc.) to reconstruct HDR codewords in the chroma channels of a mapped HDR image from the test SDR image, for example at the decoder side.

In some operational scenarios, a single closest cluster (e.g., 256 of FIG. 2E, etc.) is used for chroma mapping. It may be relatively safely assumed that any unseen SDR image/frame, which is the closest to that single cluster in the feature space, is likely to exhibit similar backward chroma mapping properties. HDR chroma channels for a mapped HDR image corresponding to the unseen SDR image/frame may be relatively reliably and accurately constructed using the set of A and B matrixes of that cluster, for example even without having access to a corresponding reference HDR image/frame.

In some other operational scenarios, instead of finding the closest cluster, a plurality of the closest μclusters (e.g., 256 of FIG. 2E, etc.) can be found such that their A and B matrices can be combined to evaluate or derive MMR coefficients for an SDR image such as the aforementioned test SDR image. This strategy of cluster fusion (e.g., 258 of FIG. 2E, etc.) may work better for video sequences as color consistency of neighboring frames can be better maintained or preserved.

Figure 2E:
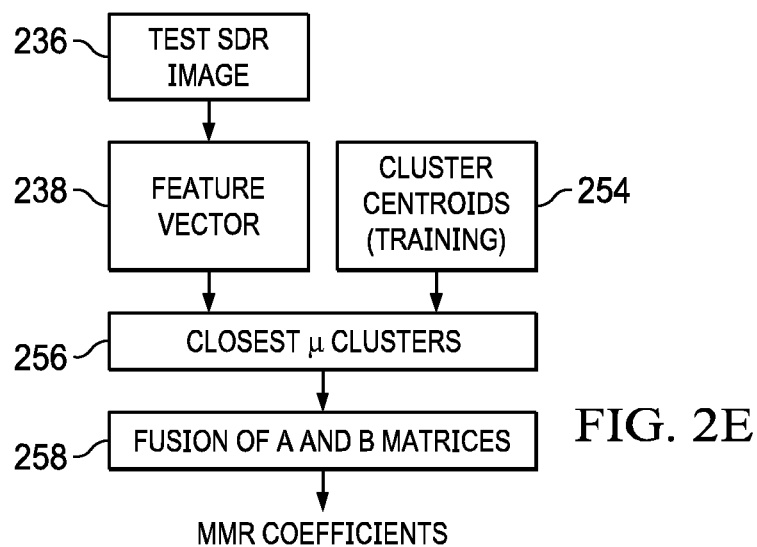
FIG. 2E depicts an example process for generating MMR coefficients from MMR matrices.

As illustrated in FIG. 2E, (test) image features may be extracted from input (test) SDR image 236 (which may be the same as 236 of FIG. 2C). By way of example, a (test) feature vector (denoted as $\tilde{x}$) 238 (which may be the same as 238 of FIG. 2C) may be extracted from the SDR image (236) and represented as a combined luma-chroma 1D histogram with histogram bins as image features.

The (test) feature vector $\tilde{x}(238)$ is then compared with all cluster centroids 254 (as derived from the training phase as illustrated in FIG. 2D) for all the clusters of feature vectors. The cluster centroids (254) can be ranked with the closest cluster centroid first and then in the order of respective closeness in relation to the (test) feature vector $\tilde{x}(238)$. Any suitable distance metric (e.g., an Euclidean distance, an L2 distance, etc.) may be used for computing respective distances of the cluster centroids (254) in relation to the (test) feature vector $\tilde{x}(238)$, so long as the distance metric is consistently used in the training phase (for clustering) and in the testing phase (for identifying the closest cluster(s)). We use Euclidean distance metric for our experiments. Given the (test) feature vector $\tilde{x}(238)$ and the cluster centroids (254) denoted as $x_c$, cluster(s) with the closest distance(s) between the (test) feature vector $\tilde{x}(238)$ and the cluster centroids (254) can be formulated as follows:

$$\operatorname*{argmin}_c d(\tilde{x}, x_c) = \operatorname*{argmin}_c \|x_c - \tilde{x}\|^2 \qquad (29)$$

In some operational scenarios, for a single test image, A, $B^{c0}$ and $B^{c1}$ matrices of a single (e.g., the closest, etc.) cluster may be used to derive MMR coefficients for performing chroma backward reshaping on the test image.

In some operational scenarios, for a video sequence, a single cluster approach may be less safe as adjacent images/frames in the video sequence can be mapped to different cluster centroids and thus different clusters, thereby possibly leading to color fluctuations within the video sequence such as a particular video scene. To maintain color consistency within the scene or the video sequence, a plurality sets of cluster-specific A and B matrices from a plurality of top μ(the closest) clusters can be fused (e.g., 258 of FIG. 2E, etc.) together to form a collective set of A and B matrices, which can be used to perform chroma mapping on every SDR image/frame of the video sequence.

Cluster fusion as described may be implemented or performed through averaging the plurality of sets of cluster-specific A and B matrices of the top U clusters to obtain or generate unified chroma mapping operational parameters (e.g., MMR coefficients, etc.). In an example, the cluster-specific A and B matrices may be fused (e.g., 258 of FIG. 2E, etc.) or combined with simple averaging or weighted averaging.

FIG. 3C illustrates example cluster fusion (e.g., 258 of FIG. 2E, etc.) with two top clusters (μ=2). Two respective distances of the test feature vector $\tilde{x}$(filled circle) from the top two clusters are d1 and d2. Denote two sets of cluster-specific matrices for the top two clusters as $(A_1, B_1^{c0}, B_1^{c1})$ and $(A_2, B_2^{c0}, B_2^{c1})$, respectively. Denote cluster centroids for the top two clusters as $x_1$ and $x_2$, respectively. In a first example, a set of fused A and B matrices may be derived through simple averaging as follows:

$$A = (A_1 + A_2)/\mu$$

$$B^{c0} = (B_1^{c0} + B_2^{c0})/\mu$$

$$B^{c1} = (B_1^{c1} + B_2^{c1})/\mu \qquad (30)$$

In a second example, a set of fused A and B matrices may be derived through weighted averaging as follows:

$$d = \left(\frac{1}{\frac{1}{d1} + \frac{1}{d2}}\right), \text{ where } d1 = d(\tilde{x}, x_1) = \|x_1 - \tilde{x}\|^2 \text{ and} \quad (31)$$

$$d2 = d(\tilde{x}, x_2) = \|x_2 - \tilde{x}\|^2$$

$$A = \frac{d}{d1} \times A_1 + \frac{d}{d2} \times A_2$$

$$B^{c0} = \frac{d}{d1} \times B_1^{c0} + \frac{d}{d2} \times B_2^{c0}$$

$$B^{c1} = \frac{d}{d1} \times B_1^{c1} + \frac{d}{d2} \times B_2^{c1}$$

As can be seen in expressions (31) above, the weights used in weighed averaging can be chosen to be the reciprocals of the distances between the test feature vector $\tilde{x}$ and the cluster centroids. The shorter the distance of a cluster, the larger the weight assigned to the cluster. The weighting strategy can be extended to perform cluster fusion with more than two clusters such as $\mu=4$, 5, etc.

The MMR coefficients for chroma mapping the test SDR image may be derived as follows:

$$u^{c0,opt} = A^{-1} B^{c0}$$

$$u^{c1,opt} = A^{-1} B^{c1} \quad (32)$$

Chroma prediction (prediction or estimation of HDR chroma codewords from SDR luma and chroma codewords) may make use of an offline trained chroma dictionary to determine or extract optimized chroma backward mapping operational parameters. The chroma dictionary contains a list of cluster-specific (A, $B^{c0}$, $B^{c1}$) matrices that can be used to derive MMR coefficients for backward reshaping an SDR image into a corresponding a mapped HDR image. Fusion of multiple sets of cluster-specific cluster (A, $B^{c0}$, $B^{c1}$) matrices can be used to help maintain color consistency across neighboring image/frames in a video sequence of (e.g., sequential, consecutive, etc.) images/frames.

Example Applications of Machine Learnt Luma and Chroma Mappings

Luma and chroma backward reshaping mappings (prediction/estimation of HDR luma and chroma codewords from SDR luma and chroma codewords) can be used to open up (or support) a wide variety of different possibilities for manipulating the HDR look and for optimizing metadata.

Style Transfer with Encoder

Figure 2F:
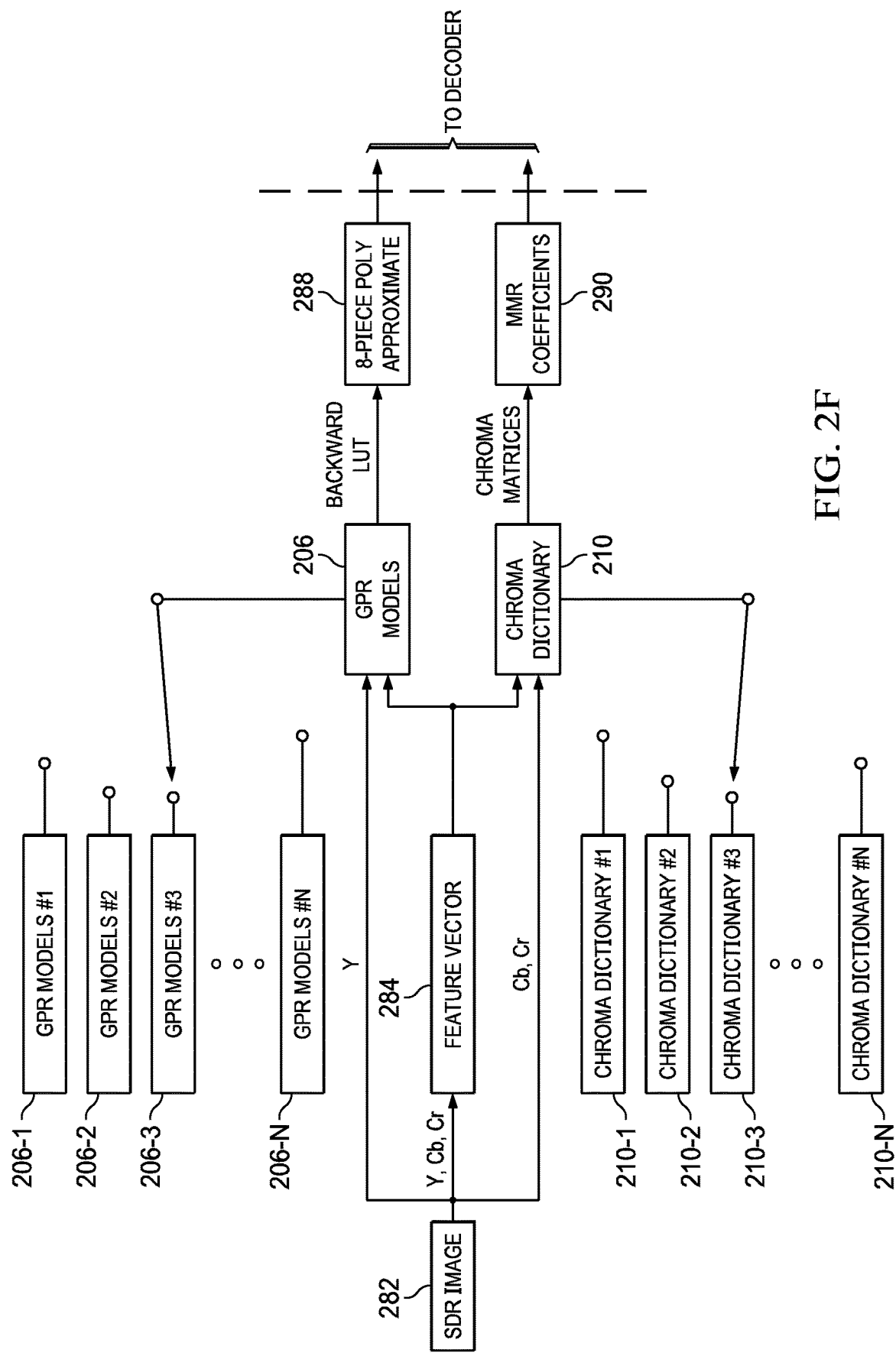
FIG. 2F and FIG. 2G depict example style transfer with encoders.

In some operational scenarios, as illustrated in FIG. 2F, different styles (e.g., a style preferring bluish images, a style preferring reddish images, a style of a first colorist preferring strong contrasts, a style of a different colorist preferring softer images, etc.) or different HDR looks can be transferred from an upstream video encoder to downstream video decoder(s) by way of dynamic composer metadata carried in a video signal or coded bitstream encoded with SDR images.

For each SDR image 282 encoded in the video signal or coded bitstream, a first portion of the dynamic composer metadata transmitted from the encoder to the decoder(s) can include first operational parameters specifying or defining a luma backward reshaping mapping (e.g., backward reshaping curves, BLUTs, etc.) generated by applying a selected set of GPR models to a feature vector 284 comprising image features (e.g., image features computed based on codewords in channels Y, Cb/C0, and Cr/C1, etc.) extracted from the SDR image (282).

The selected set of GPR models for the SDR image (282) may be selected from among different sets of GPR models such as 206-1 through 206-N, wherein N is a positive integer greater than one (1). The different sets of GPR models 206-1 through 206-N may be trained by different sets of training SDR-HDR image pairs in one or more different training datasets. For example, for a set of training SDR images, multiple sets of corresponding training HDR images may be generated with each set in the multiple sets of corresponding training HDR images representing a distinct user-desired style or HDR look among multiple user-desired styles or HDR looks represented in the multiple sets of corresponding training HDR images. As used herein, a user desired style or HDR look may refer to a style of images (e.g., HDR images, etc.) as preferred or intended by a user such as a colorist, a professional video creator, a studio, etc.

In an example, a selected set of GPR models corresponding to a selected user desired style or HDR look may be a single set of GPR models selected (e.g., based on user preferences, system configuration information, etc.) from among the different sets of GPR models 206-1 through 206-N.

The first portion of the dynamic composer metadata transmitted from the encoder to the decoder(s), or the first operational parameters specifying or defining the luma backward reshaping mapping, for the SDR image (282) may include a representation/specification of a BLUT or backward reshaping curve to be used by the decoder(s) to backward reshape SDR luma codewords in the SDR image (282) into mapped HDR luma codewords in a corresponding mapped HDR image. In some embodiments, the BLUT or backward reshaping curve may be partitioned or divided into a plurality of (e.g., maximum 8, etc.) curve segments respectively approximated with a plurality of second-order polynomials 288. Polynomial coefficients specifying or defining the plurality or set of second-order polynomials (288) can be sent in the first portion of the dynamic composer metadata from the encoder to the downstream decoder(s) for the (each) SDR image/frame (282) in one or more image metadata containers (e.g., separate from image content containers, etc.) in the video signal or the coded bitstream.

Similarly, for each SDR image (282) encoded in the video signal or coded bitstream, a second portion of the dynamic composer metadata transmitted from the encoder to the decoder(s) can include second operational parameters specifying or defining a chroma backward reshaping mapping (e.g., MMR coefficients, etc.) generated by applying a selected chroma dictionary (e.g., comprising a plurality of sets of A and B matrices, MMR coefficients in these matrices, etc.) to the feature vector (284).

The selected chroma dictionary for the SDR image (282) may be selected from among different chroma dictionaries such as 210-1 through 210-N, wherein N—which may or may not be the same integer as that for GPR models as discussed above—is a positive integer greater than one (1). The different chroma dictionaries 210-1 through 210-N may be trained by different sets—which may or may not be the same sets as that for GPR models as discussed above—of training SDR-HDR image pairs in the different training datasets. These different sets of training SDR-HDR image pairs in the different training datasets can have different corresponding user desired styles or HDR looks.

In an example, the selected chroma dictionary may be a single chroma dictionary (e.g., based on user preferences, system configuration information, etc.) selected from among the different chroma dictionaries 210-1 through 210-N.

The second portion of the dynamic composer metadata transmitted from the encoder to the decoder(s), or the second operational parameters specifying or defining the chroma backward reshaping mapping, for the SDR image (282) may include MMR coefficients 290 in chroma matrices (e.g., A and B matrices) to be used by the decoder(s) to map SDR luma and chroma codewords in the SDR image (282) into mapped HDR chroma codewords in the corresponding mapped HDR image. The MMR coefficients (290) can be sent in the second portion of the dynamic composer metadata from the encoder to the downstream decoder(s) for the (each) SDR image/frame (282) in one or more image metadata containers (e.g., separate from image content containers, etc.) in the video signal or the coded bitstream.

The different sets of SDR-HDR image pairs that support style transfer may comprise (training) HDR images of (or tailored to) different HDR looks or different user defined styles. For example, a first set of SDR-HDR image pairs in a first training dataset of the training datasets may correspond a first HDR look or a first user defined style, whereas a second different set of SDR-HDR image pairs in a second training dataset of the training datasets may correspond to a second different HDR look or a second different user defined style.

For each SDR image (282), the different luma and chroma backward reshaping mappings of different HDR looks or different user defined styles may be represented by different BLUTs and/or different sets of MMR coefficients generated based on the different sets of GPR (luma prediction/estimation) models (206-1 through 206-N) and/or by different chroma dictionaries (210-1 through 210-N). The different sets of GPR models and/or the different chroma dictionaries can be respectively trained on different sets of SDR-HDR image pairs of different HDR looks or different user defined styles (in the different training datasets) and then individually (e.g., a selected closest style or look based on a distance measure, etc.) applied to any (e.g., test, to-be-predicted, to-be-backward-reshaped, etc.) SDR image such as the SDR image (282).

GPR models and a chroma dictionary learned on a set of (training) HDR images in a specific training dataset of the training datasets can be used to capture inherent user intent as embodied in the specific style(s) or look(s) of the set of HDR images. These GPR models and the chroma dictionary in turn can be used to permeate the style(s) or the look(s) in the set of (training) HDR images in the specific training dataset to mapped HDR images generated from backward reshaping other (e.g., hitherto, etc.) unseen SDR images.

By way of illustration, a user is free (or allowed) to manipulate training HDR images that correspond to (or depict the same visual objects, characters, scenes, backgrounds, etc.) training SDR images into one or more user-desired styles or one or more HDR looks to which the user desires or intends to adapt. The training SDR images can be paired with training HDR images of each of the one or more user-desired styles or the one or more HDR looks to form a training dataset, giving rise to one or more different training datasets.

Subsequently, one or more sets of GPR models and one or more chroma dictionaries as described herein can be directly and automatically trained through machine learning using the training SDR images and the training HDR images in each training dataset (of the one or more different training datasets) with a respective user defined style or HDR look as input.

The trained GPR models and chroma dictionaries can then automatically permeate or propagate a specific supported user-desired style or HDR look among all the user-desired styles or HDR look to any other mapped HDR images generated by backward reshaping any other SDR images, without user performing any manipulation or manual operations on these other mapped HDR images in order for the other mapped HDR images to acquire the specific supported user-desired style or HDR look represented in the training HDR images in one of the one or more training datasets. As a result, under techniques as described herein, costs and efforts for generating mapped HDR images of a user-desired style or HDR look can be significantly reduced to a level far less than under other approaches such as manually applying the user's desired style or HDR look to composed HDR images for every video sequence.

To transfer style from the encoder side to the decoder side, the upstream video encoder can switch between or among various chroma dictionaries (210-1 through 210-N) and sets of GPR models (206-1 through 210-N) trained by one or more users respectively with the different training datasets. Selecting a specific chroma dictionary and a specific set of GPR models, as trained by a specific training dataset of the different training datasets, can lead to creating dynamic composer metadata for achieving a specific user-desired style or HDR look as represented in training HDR images of the specific training dataset.

Dynamic composer metadata as described herein may be compressed/encoded into a video signal in one or more image metadata containers/constructs separate from image content containers/constructs used to carry media content data (e.g., video frames, audio samples, transform coefficients, etc.).

A chroma dictionary may comprise a plurality of A and B matrices for each chroma channel. As illustrated in FIG. 2F, in some embodiments, (e.g., 22, etc.) MMR coefficients derived from one or more sets of A and B matrices in the chroma dictionary can be sent for each SDR image/frame separately in the video signal. However, in operational scenarios in which video sequences are long, data volumes of dynamic composer metadata comprising MMR coefficients of a chroma dictionary to be transmitted to the downstream decoder(s) can be quite large.

In some embodiments, instead of sending MMR coefficients for each SDR image/frame individually, a specific (supported) chroma dictionary (e.g., one of 210-1 through 210-N, etc). can be sent at the beginning of a video sequence for which the specific chroma dictionary selected from the chroma dictionaries may be used for backward reshaping purposes.

Figure 2G:
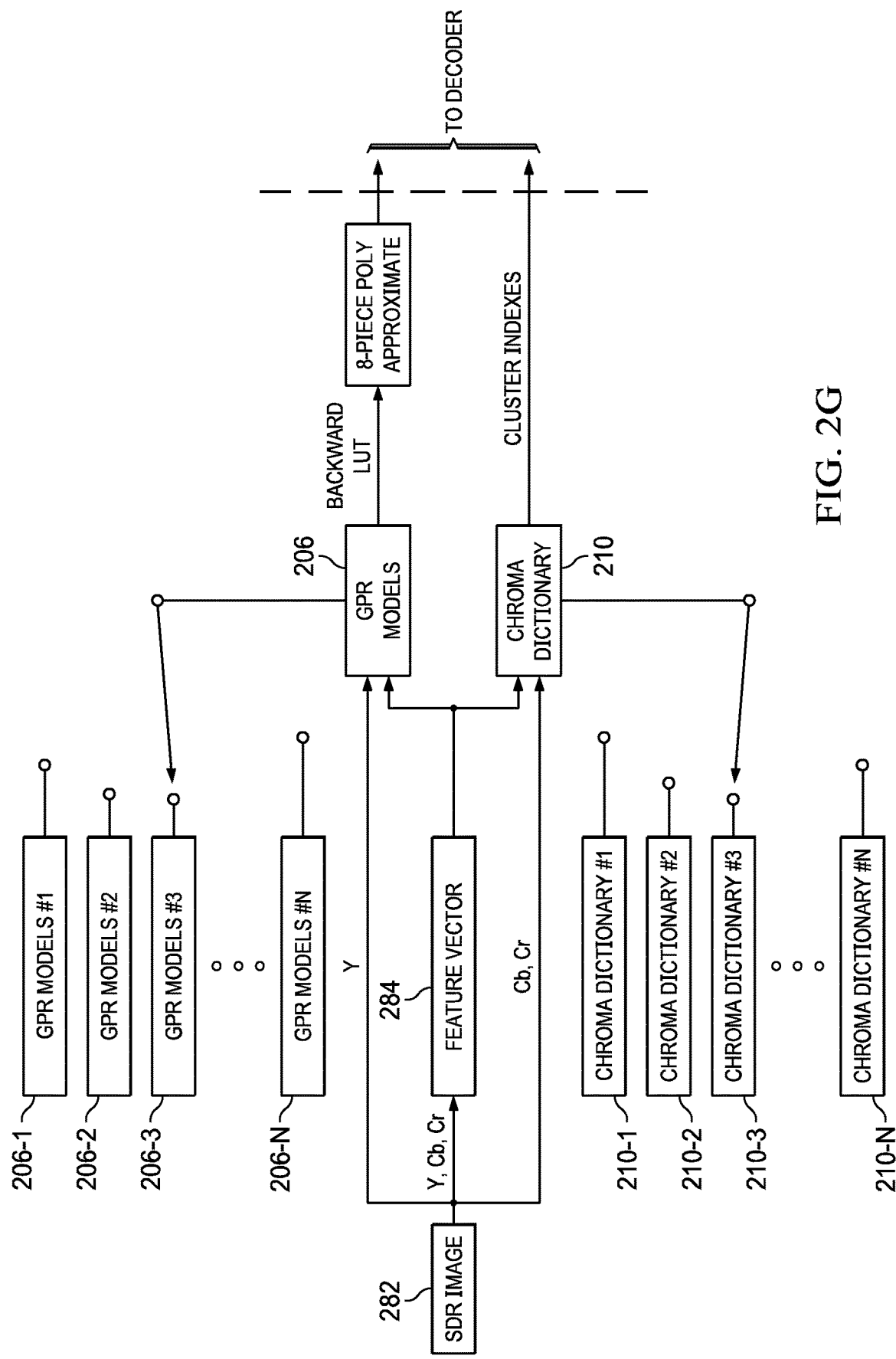

As illustrated in FIG. 2G, on the encoder side, for each SDR image/frame (282) in the video sequence, only one or more (e.g., cluster, etc.) index numbers or values (or chroma dictionary indexes) identifying one or more selected clusters (e.g., the top closest cluster(s) selected based on a feature vector extracted from the SDR image/frame, etc.) of (training) SDR-HDR image pairs in a specific training dataset (used to train or derive the selected chroma dictionary) of the different training datasets are transmitted along with the SDR image/frame (282) to the downstream decoder(s). The index numbers or values transmitted to the downstream decoder(s) can be used by the downstream decoder(s) to look up and retrieve one or more selected sets of A and B matrices in the specific chroma dictionary corresponding to the one or more clusters. The retrieved sets of A and B matrices in the specific chroma dictionary can be used to derive or fused into a (e.g., top closest, combined/fused, etc.)

set of A and B matrices from which MMR coefficient can be derived at the decoder side for chroma backward reshaping. As a result, data volumes for the transmitted dynamic composer metadata can be drastically or significantly reduced—22 MMR coefficients for each SDR image/frame versus one or more index numbers/values for lookup operations for each chroma channel. Cluster index numbers/values in the specific chroma dictionary can be encoded into the video signal based on a coding syntax that supports encoding these numbers/values.

Style Transfer with Decoder

Similar to style transfer with the encoder side, some or all style transfer as described herein may be enabled, implemented or performed at the decoder side.

Figure 2H:
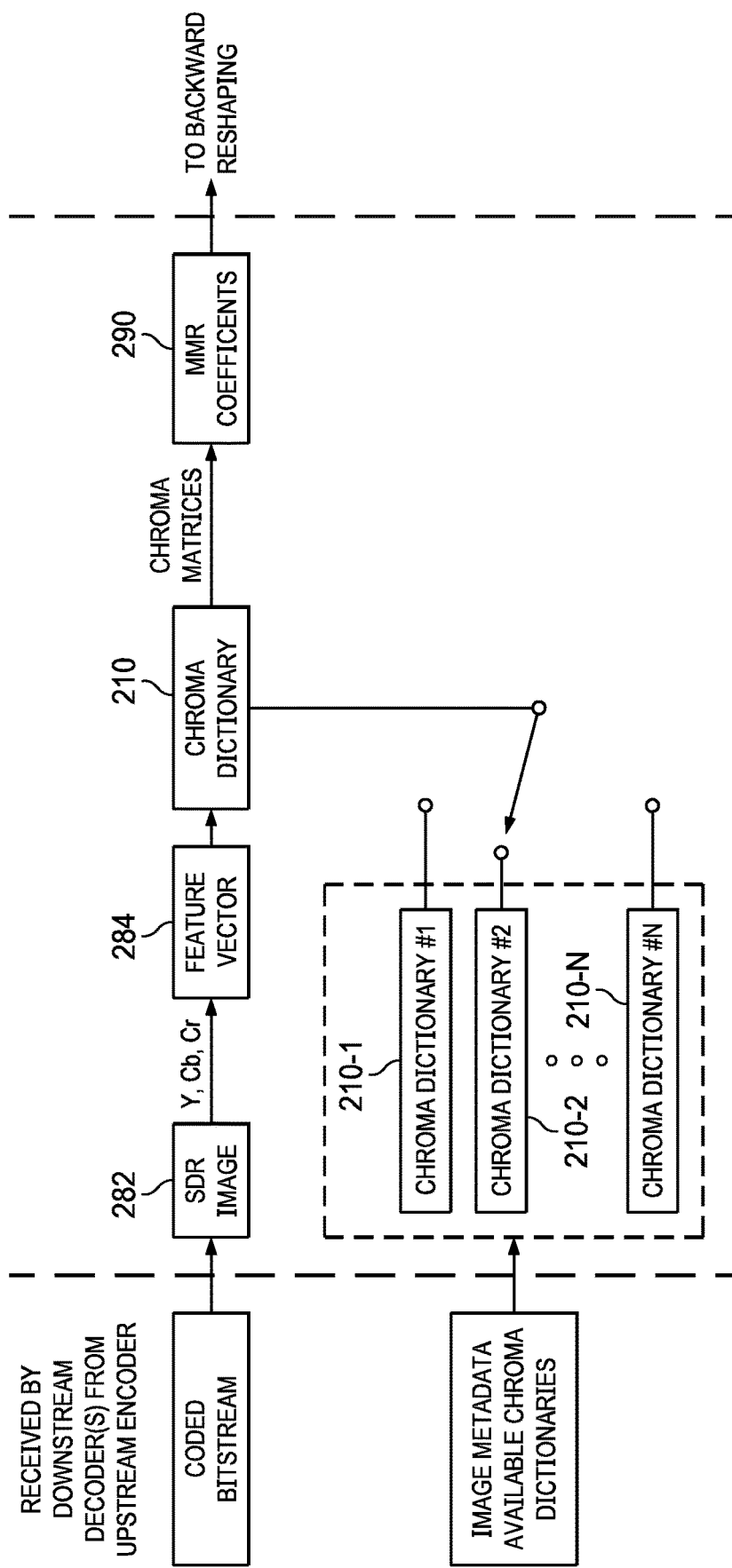
FIG. 2H depicts example style transfer with decoders.

As illustrated in FIG. 2H, a coded bitstream encoded with one or more SDR video sequences and image metadata comprising specific BLUTs built with a specific set of GPR models selected from all available sets of GPR modes and a specific chroma dictionary selected from all available chroma dictionaries (e.g., 210-1 through 210-N, etc.) may be received by a downstream decoder directly or indirectly from an upstream encoder. The available sets of GPR models and the available chroma dictionaries (210-1 through 210-N) may correspond to, or may be derived from machine learning with, one or more respective sets of (training) SDR-HDR image pairs in one or more training datasets. Each set of SDR-HDR image pairs in the respective sets of SDR-HDR image pairs may comprise image clusters generated from an automatic clustering algorithm/method and correspond to a respective user-desired style or HDR look. The selected chroma dictionary may be sent in the image metadata at the beginning of a video sequence comprising an SDR image (e.g., 282, etc.) from which a mapped HDR image is to acquire a selected user-desired style or HDR look. The specific BLUTs may be sent in the image metadata along with SDR images (e.g., one image-specific BLUT for one SDR image, etc.) from which mapped HDR images are to acquire the selected user-desired style or HDR look.

In some embodiments, the image metadata comprises dynamic composer metadata that carry or comprise one or more specific cluster indexes (e.g., one or more numbers, one or more values, one or more integers, etc.) identifying one or more specific chroma clusters to be combined/fused into a combined/fused chroma cluster for deriving MMR coefficients, which can then be used for performing chroma backward reshaping on the SDR image (282). This process of style transfer is similar to the style transfer at the encoder side, with overheads of transmitting the selected chroma dictionary among the available chroma dictionaries (210-1 through 210-N) beforehand and entrusting the decoder with the task of computing or deriving MMR coefficients (e.g., 290, etc.) from chroma matrices of the selected or combined/fused A and B matrices in the specific chroma dictionary and applying the derived MMR coefficients (290) to a feature vector (e.g., 284, etc.) extracted (e.g., by the decoder, by the encoder, etc.) from the SDR image (282). As a result, the user desired style or the HDR look can be controlled at the decoder side.

Apart from providing freedom of manipulating the HDR look, techniques as described herein also improves the HDR experience as compared with a static metadata approach. The static metadata may use a fixed backward LUT and MMR coefficients irrespective of individual SDR characteristics of individual SDR images, which could lead to over saturation of the highlight/bright regions in reconstructed/ mapped HDR images, desaturation of HDR chroma, elevated brightness in dark regions, etc.

These problems can be alleviated with image metadata comprising luma and chroma backward reshaping curves/mappings such as BLUTs, polynomial coefficients, chroma dictionaries, chroma dictionary indexes/numbers/values, MMR coefficients, feature vectors, and so forth. These techniques automatically learn/discern inherent characteristics of SDR content as well as (e.g., studio, user, system, etc.) desired style or HDR look through training HDR images. A feature vector from a (e.g., non-training, unseen, to-be-predicted, to-be-mapped, etc.) SDR image can be automatically compared with training feature vector clusters from training SDR images or with cluster centroids thereof. Based on this comparison, the closest cluster(s) of training SDR images can be identified relative to the SDR image. Backward reshaping mappings can then be determined/derived to cause a mapped HDR image to inherit characteristics, styles and HDR looks with those (e.g., in the closest cluster(s), etc.) already seen in a specific training dataset.

Techniques as described herein can be used to implement image metadata coding syntax for encoding image metadata such as dynamic composer metadata into a coded bitstream.

For example, coding syntaxes may be specified (so that both encoder and decoder can interpret coded values for the image metadata correctly) to carry chroma dictionary related data (e.g., chroma cluster indexes/numbers/values, chroma matrices, MMR coefficients, etc.) from an upstream video encoder to a downstream video decoder. Example coding syntaxes for carrying chroma dictionary related data are illustrated in Tables 9 and 10 below.

TABLE 9

(chroma image metadata transferred for a video sequence)

```
if( mapping_idc [ y ][ x ][ cmp ] == MAPPING_MMR_DICT ) {
    if ( cmp == 1 ) {
        // global initialization
        chroma_dict_num_clusters[ y ][ x ][ cmp ]              ue(v)
        chroma_dict_num_cluster_fusion [ y ][ x ][ cmp ]       ue(v)
        mmr_order_minus1[ y ][ x ][ cmp ]                      u(2)
        // MMR matrix A and B for each cluster
        for( i = 0; i < num_A_coeff ; i ++ ) {
            if ( coefficient_data_type = = 0 )
                chroma_dict_mat_A_int[ y ][ x ][ cmp ][i]      ue(v)
            chroma_dict_mat_A[ y ][ x ][ cmp ][i]              u(v)
        }
    }
    for( i = 0; i < num_B_coeff; i++ ) { // MMR vector B_{C0} and B_{C1}
        if ( coefficient_data_type = = 0 )
            chroma_dict_mat_B_int[ y ][ x ][ cmp ][i]          ue(v)
        chroma_dict_mat_B[ y ][ x ][ cmp ][i]                  u(v)
    }
}
```

TABLE 10

(chroma image metadata transferred for each SDR image/frame)

```
// frame wise data
for( i = 0; i < chroma_dict_num_cluster_fusion
    [ y ][ x ][ cmp ]; i++ ) {
    chroma_dict_cluster_idx[y][ x ][ cmp][i]                  u(v)
    if ( coefficient_data_type = = 0 )
        chroma_dict_cluster_wf_int[ y][ x ][ cmp ][i]         ue(v)
    chroma_dict_cluster_wf[ y][ x ][ cmp ][i]                 u(v)
}
```

A first set of coding syntax elements in the coding syntaxes, as illustrated in TABLE 9, may be used to support transferring some or all of per-sequence portions of the image metadata, for example, at a startup of sending a video sequence in a video signal (or coded bitstream) from the video encoder to the downstream video decoder. The first set of coding syntax elements may include, but are not necessarily limited to, some or all of: "chroma_dict_num_clusters" which specifies the total number of clusters for (e.g., all, available, etc.) chroma dictionaries with each of these clusters having a respective set of A and B MMR matrices; "chroma_dict_num_cluster_fusion" which specifies the total number of clusters to be fused to generate a set of combined/fused A and B matrices for a given (e.g., each, etc.) SDR image/frame (e.g., through simple averaging, through weighted averaging, etc.); "mmr_order_minus1" which specifies an MMR order (e.g., 0 for first order, 1 for second order, etc.) for C0 and C1 chroma channels used to deduce the total number of MMR coefficients for chroma backward reshaping; "num_A_coeff" which specifies the size of an A matrix; "num_B_coeff" which specifies the size of an B matrix; "chroma_dict_mat_A_int" and/or "chroma_dict_mat_A" which carry or specify integer and/or non-integer portions of the A matrix for a specific cluster; "chroma_dict_mat_B_int" and/or "chroma_dict_mat_B" which carry or specify integer and/or non-integer portions of the B matrix for a specific cluster; and so forth.

A second set of coding syntax elements in the coding syntaxes, as illustrated in TABLE 9, may be used to support transferring some or all of per-image (per-frame) portions of the image metadata, for example when sending an SDR image in the video signal (or coded bitstream) from the video encoder to the downstream video decoder. The second set of coding syntax elements may include, but are not necessarily limited to, some or all of: "chroma_dict_cluster_idx" which specifies cluster indices for each SDR image/frame; "chroma_dict_cluster_wf_int" and/or "chroma_dict_cluster_wf" which carry or specify integer and/or fractional portions of weighting factor(s) for A and B matrices during cluster fusion, and so forth.

Example Process Flows

Figure 4A:
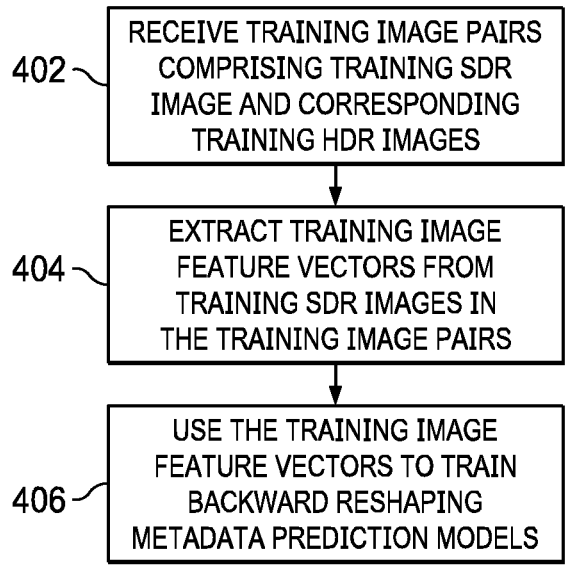
FIG. 4A and FIG. 4B illustrate example process flows.

FIG. 4A illustrates an example process flow according to an embodiment of the present invention. In some embodiments, one or more computing devices or components (e.g., an encoding device/module, a transcoding device/module, a decoding device/module, an inverse tone mapping device/module, a tone mapping device/module, a media device/module, a prediction model and feature selection system, a reverse mapping generation and application system, etc.) may perform this process flow. In block 402, an image metadata prediction system receives a plurality of training image pairs comprising a plurality of training SDR image and a plurality of corresponding training HDR images. Each training image pair in the plurality of training image pairs comprises a training SDR image in the plurality of training SDR images and a corresponding training HDR image in the plurality of corresponding training HDR images. The training SDR image and the corresponding training HDR image in each such training image pair depict same visual content but with different luminance dynamic ranges.

In block 404, the image metadata prediction system extracts a plurality of training image feature vectors from a plurality of training SDR images in the plurality of training image pairs. A training image feature vector in the plurality of training image feature vectors is extracted from a training SDR image in a respective training image pair in the plurality of training image pairs.

In block 406, the image metadata prediction system uses the plurality of training image feature vectors and ground truth derived with the plurality of corresponding training HDR images to train one or more backward reshaping metadata prediction models for predicting operational parameter values of backward reshaping mappings used to backward reshape SDR images into mapped HDR images.

The image metadata prediction system is further configured to apply the one or more backward reshaping metadata prediction models to generate a set of operational parameter values specifying an image-specific luma backward reshaping curve used to backward reshape SDR luma codewords of the SDR image into mapped HDR luma codewords of the mapped HDR image.

In an embodiment, the image metadata prediction system is further configured to perform: receiving an SDR image to be backward reshaped into a corresponding mapped HDR image; extracting an image feature vector from the SDR image; applying the one or more backward reshaping metadata prediction models to generate a set of operational parameter values specifying an image-specific luma backward reshaping curve used to backward reshape SDR luma codewords of the SDR image into mapped HDR luma codewords of the mapped HDR image.

In an embodiment, the one or more backward reshaping metadata prediction models comprise GPR models.

In an embodiment, the image metadata prediction system is further configured to perform: receiving an SDR image to be backward reshaped into a corresponding mapped HDR image; extracting an image feature vector from the SDR image; applying the GPR models to generate a set of operational parameter values specifying an image-specific luma backward reshaping curve used to backward reshape SDR luma codewords of the SDR image into mapped HDR luma codewords of the mapped HDR image.

The extracted image feature vector from the SDR image may optionally be used during the generation of the set of operational parameter values specifying an image-specific luma backward reshaping curve, the image-specificity being derived from the extracted image feature vector.

In an embodiment, the one or more backward reshaping metadata prediction models comprise a set of multivariate multiple regression (MMR) mapping matrixes.

In an embodiment, the image metadata prediction system is further configured to perform: receiving an SDR image to be backward reshaped into a corresponding mapped HDR image; extracting an image feature vector from the SDR image; applying the MMR mapping matrixes to generate a set of MMR coefficients specifying an image-specific chroma backward reshaping mapping used to map SDR luma and chroma codewords of the SDR image into mapped HDR chroma codewords of the mapped HDR image.

In an embodiment, the image feature vector is represented by a 1D luma and chroma combined histogram concatenated by luma histogram bins and chroma histogram bins.

In an embodiment, the plurality of training image pairs is divided into a plurality of clusters of training image pairs corresponding to a plurality of clusters of training image feature vectors generated through automatic clustering of the plurality of training image feature vectors; a plurality of cluster centroids is computed for the plurality of clusters of training image feature vectors; the image metadata prediction system is further configured to perform: receiving an SDR image to be backward reshaped into a corresponding mapped HDR image; extracting an image feature vector from the SDR image; locating one or more clusters of training image pairs corresponding to one or more clusters of training image feature vectors with one or more cluster centroids closest to the image feature vector in an image feature space; using one or more sets of backward reshaping metadata prediction models trained through the one or more clusters of training image pairs to determine one or more image-specific backward reshaping mappings used to map SDR luma and chroma codewords of the SDR image into mapped HDR luma and chroma codewords of the mapped HDR image.

In an embodiment, the plurality of training image pairs corresponds to a plurality of training datasets; the plurality of training datasets comprises a plurality of sets of training SDR images and a plurality of sets of corresponding training HDR images; wherein each training dataset in the plurality of datasets comprises a set of training SDR images in the plurality of sets of training SDR images and a set of corresponding training HDR images in the plurality of sets of training HDR images; the plurality of sets of corresponding training HDR images has a plurality of different HDR looks; each set of corresponding training HDR images in the plurality of sets of corresponding HDR images has a respective HDR look in a plurality of different HDR looks; the image metadata prediction system is further configured to perform: receiving an SDR image to be backward reshaped into a corresponding mapped HDR image; extracting an image feature vector from the SDR image; using a specific set of backward reshaping metadata prediction models trained through a specific training dataset in the plurality of training datasets to determine an image-specific backward reshaping mapping used to map SDR luma and chroma codewords of the SDR image into mapped HDR luma and chroma codewords of the mapped HDR image.

In an embodiment, the image metadata prediction system is further configured to perform: encoding one or more of the operational parameter values of backward reshaping mappings used to backward reshape SDR images into mapped HDR images into a video signal, along with the SDR images, as image metadata; the video signal causes one or more recipient devices to render display images derived from the mapped HDR images with one or more display devices.

In an embodiment, the one or more of the operational parameter values of backward reshaping mappings are encoded into the video signal based on an image metadata coding syntax that supports encoding and decoding of per-image dynamic composer metadata.

In an embodiment, the one or more backward reshaping metadata prediction models for predicting operational parameter values of backward reshaping mappings comprises a plurality of GPR models for predicting a plurality of mapped HDR luma codewords from a plurality of SDR luma codewords; the plurality of mapped HDR luma codewords predicted by the plurality of GPR modes is used to construct a backward reshaping curve through interpolation; the backward reshaping curve is approximated by a plurality of second-order polynomials; operational parameters specifying the plurality of second-order polynomials are provided as dynamic composer metadata to one or more recipient decoding systems.

Figure 4B:
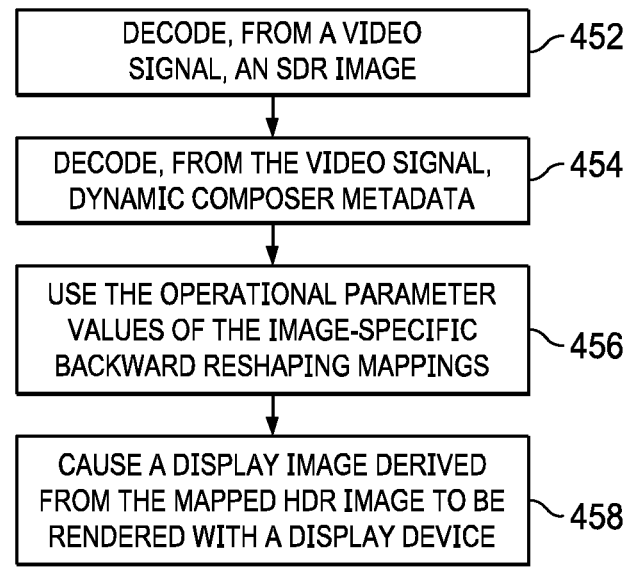

FIG. 4B illustrates an example process flow according to an embodiment of the present invention. In some embodiments, one or more computing devices or components (e.g., an encoding device/module, a transcoding device/module, a decoding device/module, an inverse tone mapping device/module, a tone mapping device/module, a media device/module, a prediction model and feature selection system, a reverse mapping generation and application system, etc.) may perform this process flow. In block 452, a video decoding system decodes, from a video signal, an SDR image to be backward reshaped into a corresponding mapped high dynamic range (HDR) image.

In block 454, the video decoding system decodes, from the video signal, dynamic composer metadata that is used to derive one or more operational parameter values of image-specific backward reshaping mappings.

The one or more operational parameter values of image-specific backward reshaping mappings are predicted by one or more backward reshaping metadata prediction models trained with a plurality of training image feature vectors. The plurality of training image feature vectors is extracted from a plurality training SDR image in a plurality of training image pairs. The plurality of training image pairs comprises a plurality of training SDR image and a plurality of corresponding training HDR images. Each training image pair in the plurality of training image pairs comprises a training SDR image in the plurality of training SDR images and a corresponding training HDR image in the plurality of corresponding training HDR images. The training SDR image and the corresponding training HDR image in each such training image pair depict same visual content but with different luminance dynamic ranges.

In block 456, the video decoding system uses the one or more operational parameter values of the image-specific backward reshaping mappings to backward reshape the SDR image into the mapped HDR image.

In block 458, the video decoding system causes a display image derived from the mapped HDR image to be rendered with a display device.

In an embodiment, the one or more operational parameter values of the image-specific backward reshaping mappings include polynomial coefficients specifying a set of 2nd order polynomials approximating a backward lookup table (BLUT). The BLUT constructed using the set of 2nd order polynomials is used to backward reshape SDR luma codewords of the SDR images into HDR luma codewords of the mapped HDR image.

In an embodiment, the one or more operational parameter values of the image-specific backward reshaping mappings include MMR coefficients specifying one or more MMR mapping matrices; the MMR coefficients are used to map SDR luma and chroma codewords of the SDR images into HDR chroma codewords of the mapped HDR image.

In an embodiment, one or more cluster indexes are decoded from the video signal for the SDR image; the one or more cluster indexes are used to identify one or more clusters in a specific chroma dictionary, among one or more chroma dictionaries, applicable to the SDR image; image-specific multivariate multiple regression (MMR) coefficients are generated from the one or more sets of chroma matrices in the specific chroma dictionary identified through the one or more cluster indexes; the image-specific MMR coefficients are used to map SDR luma and chroma codewords of the SDR image to HDR chroma codewords of the mapped HDR image.

In an embodiment, the one or more backward reshaping metadata prediction models comprise GPR models.

In an embodiment, the one or more operational parameter values of image-specific backward reshaping mappings comprise at least one value that is derived by interpolating image-specific predicted values with non-image-specific static backward reshaping mapping values. In other words, one or more operational parameter values of image-specific backward reshaping mappings comprise at least one value that is derived by a function dependent on both image-specific predicted values and non-image-specific static backward reshaping mapping values.

In an embodiment, the SDR image is represented in one of: an IPT PQ (ICtCp) color space, an YCbCr color space, an RGB color space, a Rec. 2020 color space, a Rec. 709 color space, an EDR color space, a gamma/HLG/PQ color space, a SDR color space, etc.

In an embodiment, a computing device such as a display device, a mobile device, a set-top box, a multimedia device, etc., is configured to perform any of the foregoing methods. In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

In an embodiment, a computing device comprising one or more processors and one or more storage media storing a set of instructions which, when executed by the one or more processors, cause performance of any of the foregoing methods.

Note that, although separate embodiments are discussed herein, any combination of embodiments and/or partial embodiments discussed herein may be combined to form further embodiments.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to the adaptive perceptual quantization of images with enhanced dynamic range, such as those described herein. The computer and/or IC may compute any of a variety of parameters or values that relate to the adaptive perceptual quantization processes described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to adaptive perceptual quantization of HDR images as described above by executing software instructions in a program memory accessible to the processors. The invention may also be provided in the form of a program product. The program product may comprise any non-transitory medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
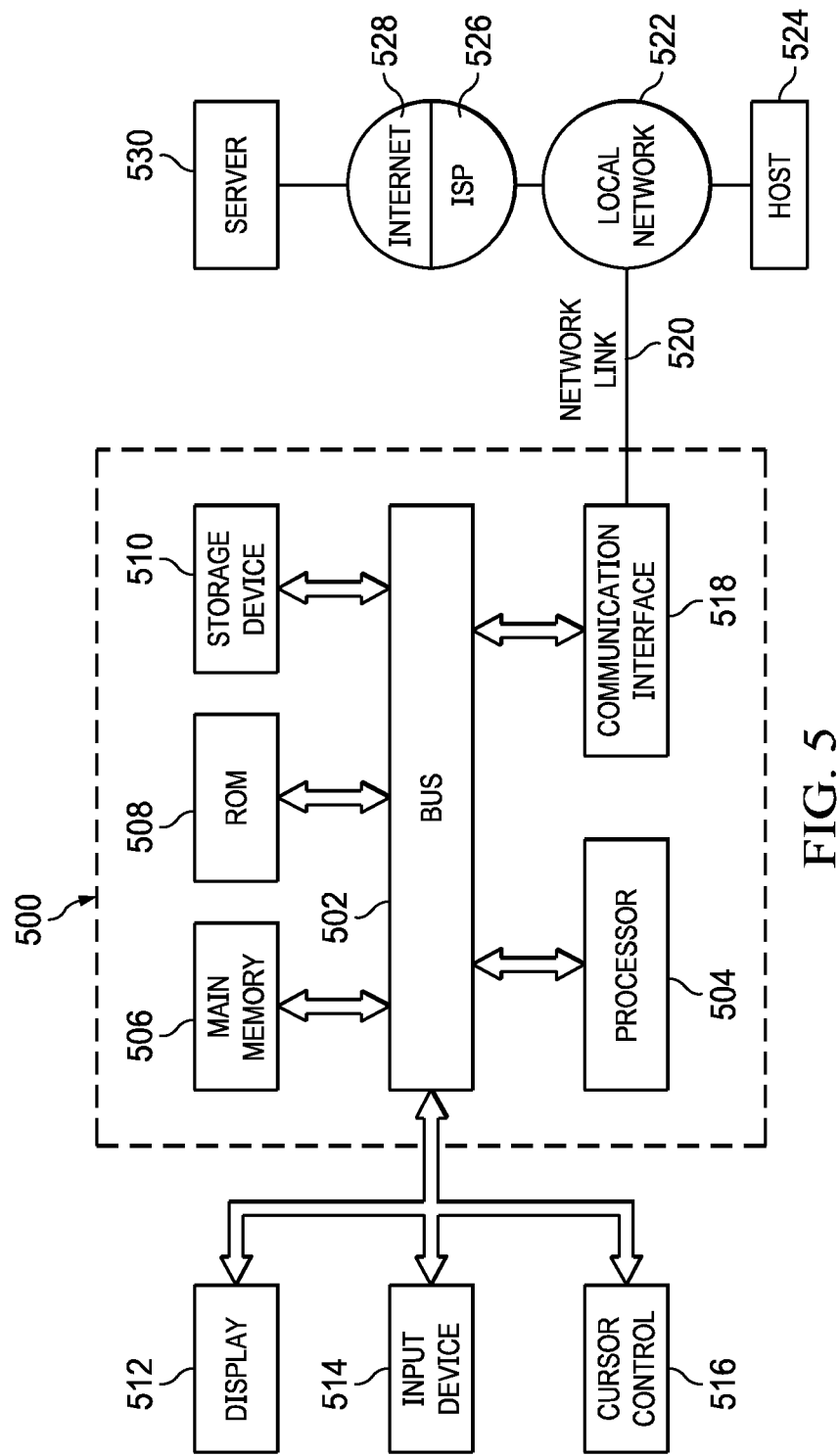
FIG. 5 illustrates a simplified block diagram of an example hardware platform on which a computer or a computing device as described herein may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques as described herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Equivalents, Extensions, Alternatives and Miscellaneous

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Enumerated Exemplary Embodiments

The invention may be embodied in any of the forms described herein, including, but not limited to the following Enumerated Example Embodiments (EEEs) which describe structure, features, and functionality of some portions of the present invention.

EEE1. A method comprising:
  receiving a plurality of training image pairs comprising a plurality of training standard dynamic range (SDR) image and a plurality of corresponding training high dynamic range (HDR) images, wherein each training image pair in the plurality of training image pairs comprises a training SDR image in the plurality of training SDR images and a corresponding training HDR image in the plurality of corresponding training HDR images, wherein the training SDR image and the corresponding training HDR image in each such training image pair depict same visual content but with different luminance dynamic ranges;
  extracting a plurality of training image feature vectors from a plurality of training SDR images in the plurality of training image pairs, wherein a training image feature vector in the plurality of training image feature vectors is extracted from a training SDR image in a respective training image pair in the plurality of training image pairs;

using the plurality of training image feature vectors and ground truth derived with the plurality of corresponding training HDR images to train one or more backward reshaping metadata prediction models for predicting operational parameter values of backward reshaping mappings used to backward reshape SDR images into mapped HDR images.

EEE2. The method of EEE1, wherein the one or more backward reshaping metadata prediction models comprise Gaussian process regression (GPR) models.

EEE3. The method of EEE2, further comprising:
receiving an SDR image to be backward reshaped into a corresponding mapped HDR image;
extracting an image feature vector from the SDR image;
applying the GPR models to generate a set of operational parameter values specifying an image-specific luma backward reshaping curve used to backward reshape SDR luma codewords of the SDR image into mapped HDR luma codewords of the mapped HDR image.

EEE4. The method of any of EEEs 1-3, wherein the one or more backward reshaping metadata prediction models comprise a set of multivariate multiple regression (MMR) mapping matrixes.

EEE5. The method of EEE4, further comprising:
receiving an SDR image to be backward reshaped into a corresponding mapped HDR image;
extracting an image feature vector from the SDR image;
applying the MMR mapping matrixes to generate a set of MMR coefficients specifying an image-specific chroma backward reshaping mapping used to map SDR luma and chroma codewords of the SDR image into mapped HDR chroma codewords of the mapped HDR image.

EEE6. The method of any of EEEs 1-5, wherein the image feature vector is represented by a 1D luma and chroma combined histogram concatenated by luma histogram bins and chroma histogram bins.

EEE7. The method of any of EEEs 1-6, wherein the plurality of training image pairs is divided into a plurality of clusters of training image pairs corresponding to a plurality of clusters of training image feature vectors generated through automatic clustering of the plurality of training image feature vectors; wherein a plurality of cluster centroids is computed for the plurality of clusters of training image feature vectors; the method further comprising:
receiving an SDR image to be backward reshaped into a corresponding mapped HDR image;
extracting an image feature vector from the SDR image;
locating one or more clusters of training image pairs corresponding to one or more clusters of training image feature vectors with one or more cluster centroids closest to the image feature vector in an image feature space;
using one or more sets of backward reshaping metadata prediction models trained through the one or more clusters of training image pairs to determine one or more image-specific backward reshaping mappings used to map SDR luma and chroma codewords of the SDR image into mapped HDR luma and chroma codewords of the mapped HDR image.

EEE8. The method of any of EEEs 1-7, wherein the plurality of training image pairs corresponds to a plurality of training datasets; wherein the plurality of training datasets comprises a plurality of sets of training SDR images and a plurality of sets of corresponding training HDR images; wherein each training dataset in the plurality of datasets comprises a set of training SDR images in the plurality of sets of training SDR images and a set of corresponding training HDR images in the plurality of sets of training HDR images; wherein the plurality of sets of corresponding training HDR images has a plurality of different HDR looks; wherein each set of corresponding training HDR images in the plurality of sets of corresponding HDR images has a respective HDR look in a plurality of different HDR looks; the method further comprising:
receiving an SDR image to be backward reshaped into a corresponding mapped HDR image;
extracting an image feature vector from the SDR image;
using a specific set of backward reshaping metadata prediction models trained through a specific training dataset in the plurality of training datasets to determine an image-specific backward reshaping mapping used to map SDR luma and chroma codewords of the SDR image into mapped HDR luma and chroma codewords of the mapped HDR image.

EEE9. The method of any of EEEs 1-8, further comprising: encoding one or more of the operational parameter values of backward reshaping mappings used to backward reshape SDR images into mapped HDR images into a video signal, along with the SDR images, as image metadata, wherein the video signal causes one or more recipient devices to render display images derived from the mapped HDR images with one or more display devices.

EEE10. The method of any of EEEs 1-9, wherein the one or more of the operational parameter values of backward reshaping mappings are encoded into the video signal based on an image metadata coding syntax that supports encoding and decoding of per-image dynamic composer metadata.

EEE11. The method of any of EEEs 1-10, wherein the one or more backward reshaping metadata prediction models for predicting operational parameter values of backward reshaping mappings comprises a plurality of Gaussian process regression (GPR) models for predicting a plurality of mapped HDR luma codewords from a plurality of SDR luma codewords, wherein the plurality of mapped HDR luma codewords predicted by the plurality of GPR modes is used to construct a backward reshaping curve through interpolation, wherein the backward reshaping curve is approximated by a plurality of second-order polynomials, and wherein operational parameters specifying the plurality of second-order polynomials are provided as dynamic composer metadata to one or more recipient decoding systems.

EEE12. A method comprising:
decoding, from a video signal, a standard dynamic range (SDR) image to be backward reshaped into a corresponding mapped high dynamic range (HDR) image;
decoding, from the video signal, dynamic composer metadata that is used to derive one or more operational parameter values of image-specific backward reshaping mappings;
wherein the one or more operational parameter values of image-specific backward reshaping mappings are predicted by one or more backward reshaping metadata prediction models trained with a plurality of training image feature vectors;

where the plurality of training image feature vectors is extracted from a plurality training SDR image in a plurality of training image pairs;

wherein the plurality of training image pairs comprises a plurality of training SDR image and a plurality of corresponding training HDR images, wherein each training image pair in the plurality of training image pairs comprises a training SDR image in the plurality of training SDR images and a corresponding training HDR image in the plurality of corresponding training HDR images, wherein the training SDR image and the corresponding training HDR image in each such training image pair depict same visual content but with different luminance dynamic ranges;

using the one or more operational parameter values of the image-specific backward reshaping mappings to backward reshape the SDR image into the mapped HDR image;

causing a display image derived from the mapped HDR image to be rendered with a display device.

EEE13. The method of EEE12, wherein the one or more operational parameter values of the image-specific backward reshaping mappings include polynomial coefficients specifying a set of 2nd order polynomials approximating a backward lookup table (BLUT); wherein the BLUT constructed using the set of 2nd order polynomials is used to backward reshape SDR luma codewords of the SDR images into HDR luma codewords of the mapped HDR image.

EEE14. The method of EEE12 or EEE13, wherein the one or more operational parameter values of the image-specific backward reshaping mappings include multivariate multiple regression (MMR) coefficients specifying one or more MMR mapping matrices; wherein the MMR coefficients are used to map SDR luma and chroma codewords of the SDR images into HDR chroma codewords of the mapped HDR image.

EEE15. The method of any of EEEs 12-14, wherein one or more cluster indexes are decoded from the video signal for the SDR image; wherein the one or more cluster indexes are used to identify one or more clusters in a specific chroma dictionary, among one or more chroma dictionaries, applicable to the SDR image; wherein image-specific multivariate multiple regression (MMR) coefficients are generated from the one or more sets of chroma matrices in the specific chroma dictionary identified through the one or more cluster indexes; wherein the image-specific MMR coefficients are used to map SDR luma and chroma codewords of the SDR image to HDR chroma codewords of the mapped HDR image.

EEE16. The method of any of EEEs 12-15, wherein the one or more backward reshaping metadata prediction models comprise Gaussian process regression (GPR) models.

EEE17. The method of any of EEEs 12-16, wherein the one or more operational parameter values of image-specific backward reshaping mappings comprise at least one value that is derived by interpolating image-specific predicted values with non-image-specific static backward reshaping mapping values.

EEE18. The method of any of EEEs 12-17, wherein the SDR image is represented in one of: an IPT PQ (ICtCp) color space, an YCbCr color space, an RGB color space, a Rec. 2020 color space, a Rec. 709 color space, an extended dynamic range (EDR) color space, a gamma/HLG/PQ color space, or a standard dynamic range (SDR) color space.

EEE19. A computer system configured to perform any one of the methods recited in EEEs 1-18.

EEE20. An apparatus comprising a processor and configured to perform any one of the methods recited in EEEs 1-18.

EEE21. A non-transitory computer-readable storage medium having stored thereon computer-executable instruction for executing a method in accordance with any of the methods recited in EEEs 1-18.

The invention claimed is:

1. A method comprising:

receiving a plurality of training image pairs comprising a plurality of training standard dynamic range (SDR) image and a plurality of corresponding training high dynamic range (HDR) images, wherein each training image pair in the plurality of training image pairs comprises a training SDR image in the plurality of training SDR images and a corresponding training HDR image in the plurality of corresponding training HDR images, wherein the training SDR image and the corresponding training HDR image in each such training image pair depict same visual content but with different luminance dynamic ranges;

extracting a plurality of training image feature vectors from a plurality of training SDR images in the plurality of training image pairs, wherein a training image feature vector in the plurality of training image feature vectors is extracted from a training SDR image in a respective training image pair in the plurality of training image pairs;

using the plurality of training image feature vectors and ground truth derived with the plurality of corresponding training HDR images to train one or more backward reshaping metadata prediction models for predicting operational parameter values of backward reshaping mappings used to backward reshape SDR images into mapped HDR images; and applying the one or more backward reshaping metadata prediction models to generate a set of operational parameter values specifying an image-specific luma backward reshaping curve used to backward reshape SDR luma codewords of the SDR images into mapped HDR luma codewords of the mapped HDR images.

2. The method of claim 1, wherein the one or more backward reshaping metadata prediction models comprise Gaussian process regression (GPR) models;

the method further comprising:

receiving an SDR image to be backward reshaped into a corresponding mapped HDR image;

extracting an image feature vector from the SDR image; and applying the GPR models to generate a set of operational parameter values specifying an image-specific luma backward reshaping curve used to backward reshape SDR luma codewords of the SDR image into mapped HDR luma codewords of the mapped HDR image.

3. The method of claim 1, wherein the one or more backward reshaping metadata prediction models comprise a set of multivariate multiple regression (MMR) mapping matrixes.

4. The method of claim 1, wherein the image feature vector is represented by a 1D luma and chroma combined histogram concatenated by luma histogram bins and chroma histogram bins.

5. The method of claim 1, wherein the plurality of training image pairs is divided into a plurality of clusters of training image pairs corresponding to a plurality of clusters of training image feature vectors generated through automatic clustering of the plurality of training image feature vectors; wherein a plurality of cluster centroids is computed for the plurality of clusters of training image feature vectors; the method further comprising:
receiving an SDR image to be backward reshaped into a corresponding mapped HDR image;
extracting an image feature vector from the SDR image;
locating one or more clusters of training image pairs corresponding to one or more clusters of training image feature vectors with one or more cluster centroids closest to the image feature vector in an image feature space;
using one or more sets of backward reshaping metadata prediction models trained through the one or more clusters of training image pairs to determine one or more image-specific backward reshaping mappings used to map SDR luma and chroma codewords of the SDR image into mapped HDR luma and chroma codewords of the mapped HDR image.

6. The method of claim 1, wherein the plurality of training image pairs corresponds to a plurality of training datasets; wherein the plurality of training datasets comprises a plurality of sets of training SDR images and a plurality of sets of corresponding training HDR images; wherein each training dataset in the plurality of datasets comprises a set of training SDR images in the plurality of sets of training SDR images and a set of corresponding training HDR images in the plurality of sets of corresponding training HDR images; wherein the plurality of sets of corresponding training HDR images has a plurality of different HDR looks; wherein each set of corresponding training HDR images in the plurality of sets of corresponding HDR images has a respective HDR look in a plurality of different HDR looks; the method further comprising:
receiving an SDR image to be backward reshaped into a corresponding mapped HDR image;
extracting an image feature vector from the SDR image;
using a specific set of backward reshaping metadata prediction models trained through a specific training dataset in the plurality of training datasets to determine an image-specific backward reshaping mapping used to map SDR luma and chroma codewords of the SDR image into mapped HDR luma and chroma codewords of the mapped HDR image.

7. The method of claim 1, wherein the one or more of the operational parameter values of backward reshaping mappings are encoded into the video signal based on an image metadata coding syntax that supports encoding and decoding of per-image dynamic composer metadata.

8. The method of claim 1, wherein the one or more backward reshaping metadata prediction models for predicting operational parameter values of backward reshaping mappings comprises a plurality of Gaussian process regression (GPR) models for predicting a plurality of mapped HDR luma codewords from a plurality of SDR luma codewords, wherein the plurality of mapped HDR luma codewords predicted by the plurality of GPR modes is used to construct a backward reshaping curve through interpolation, wherein the backward reshaping curve is approximated by a plurality of second-order polynomials, and wherein operational parameters specifying the plurality of second-order polynomials are provided as dynamic composer metadata to one or more recipient decoding systems.

9. A computer system configured to perform the method of claim 1.

10. An apparatus comprising a processor and configured to perform the method of claim 1.

11. A non-transitory computer-readable storage medium having stored thereon instructions which, when executed by a computing device or a processor, cause said computing device or processor to perform the method of claim 1.

12. A method comprising:
decoding, from a video signal, a standard dynamic range (SDR) image to be backward reshaped into a corresponding mapped high dynamic range (HDR) image;
decoding, from the video signal, dynamic composer metadata that is used to derive one or more operational parameter values of image-specific backward reshaping mappings;
wherein the one or more operational parameter values of image-specific backward reshaping mappings are predicted by one or more backward reshaping metadata prediction models trained with a plurality of training image feature vectors;
where the plurality of training image feature vectors is extracted from a plurality training SDR image in a plurality of training image pairs;
wherein the plurality of training image pairs comprises a plurality of training SDR image and a plurality of corresponding training HDR images, wherein each training image pair in the plurality of training image pairs comprises a training SDR image in the plurality of training SDR images and a corresponding training HDR image in the plurality of corresponding training HDR images, wherein the training SDR image and the corresponding training HDR image in each such training image pair depict same visual content but with different luminance dynamic ranges;
using the one or more operational parameter values of the image-specific backward reshaping mappings to backward reshape the SDR image into the mapped HDR image;
causing a display image derived from the mapped HDR image to be rendered with a display device.

13. The method of claim 12, wherein the one or more operational parameter values of the image-specific backward reshaping mappings include polynomial coefficients specifying a set of $2^{nd}$ order polynomials approximating a backward lookup table (BLUT); wherein the BLUT constructed using the set of $2^{nd}$ order polynomials is used to backward reshape SDR luma codewords of the SDR images into HDR luma codewords of the mapped HDR image.

14. The method of claim 12, wherein the one or more operational parameter values of the image-specific backward reshaping mappings include multivariate multiple regression (MMR) coefficients specifying one or more MMR mapping matrices; wherein the MMR coefficients are used to map SDR luma and chroma codewords of the SDR images into HDR chroma codewords of the mapped HDR image.

15. The method of claim 12, wherein the one or more operational parameter values of image-specific backward reshaping mappings comprise at least one value that is derived by a function dependent on both image-specific predicted values and non-image-specific static backward reshaping mapping values.

* * * * *